United States Patent [19]
Steele, Jr.

[11] Patent Number: 5,910,910
[45] Date of Patent: Jun. 8, 1999

[54] CIRCUIT AND METHOD FOR RAPID CALCULATION OF QUOTIENTS AND SQUARE ROOTS

[75] Inventor: Guy L. Steele, Jr., Lexington, Mass.

[73] Assignee: Sun Microsystems, Inc., Palo Alto, Calif.

[21] Appl. No.: 08/880,408

[22] Filed: Jun. 23, 1997

[51] Int. Cl.⁶ .................................................. G06F 7/52
[52] U.S. Cl. ........................................ 364/761; 364/767
[58] Field of Search .................................. 364/761, 767, 364/748.1, 766, 752

[56] References Cited

U.S. PATENT DOCUMENTS

| | | | |
|---|---|---|---|
| 4,939,686 | 7/1990 | Fandrianto | 364/752 |
| 5,128,891 | 7/1992 | Lynch et al. | 364/767 |
| 5,237,525 | 8/1993 | Rossbach | 364/766 |
| 5,258,944 | 11/1993 | Smith | 364/748.1 |
| 5,272,660 | 12/1993 | Rossbach | 364/748.1 |
| 5,301,139 | 4/1994 | Zinger | 364/767 |
| 5,357,455 | 10/1994 | Sharangpani et al. | 364/767 |
| 5,386,376 | 1/1995 | Girard et al. | 364/767 |
| 5,696,712 | 12/1997 | Prabhu et al. | 364/761 |

*Primary Examiner*—Ayaz R. Sheikh
*Assistant Examiner*—Douglas S. Lee
*Attorney, Agent, or Firm*—Finnegan, Henderson, Farabow, Garrett & Dunner, L.L.P.

[57] ABSTRACT

A circuit and method for accelerating the division algorithm and square root operations relating to integers or floating-point numbers. Minimization of the number of gate delays per quotient digit generated is achieved through the use of triply-redundant representation of the partial remainder and a fully-overlapped quotient digit prediction scheme suitable for logic implementation. Moreover, faster quotient digit selection is achieved by prescaling the dividend and divisor.

60 Claims, 22 Drawing Sheets

CIRCUIT AND METHOD FOR RAPID CALCULATION OF QUOTIENTS AND SQUARE ROOTS

BACKGROUND OF THE INVENTION

The present invention relates generally to digital computer processing, and more particularly to a circuit and method of accelerating the computer implementation of the Sweeney-Robertson-Tocher ("SRT") algorithm for carrying out floating-point division and square root operations.

Advances in computer processing have occurred primarily as a result of improved logic design and more efficient computational processes. While nearly all computer-implemented algorithms are based on a hierarchy of relatively simple operations, not all are performed by a computer at the same speed. What distinguishes computer operation of various algorithms in terms of speed is the way in which the algorithm is implemented in available hardware. The speed by which a computer can perform an algorithm depends in large part on the efficiency of the digital logic on which the algorithm is implemented and in the way the computation is structured.

Division is arguably the most complex of the arithmetic operations to implement because it typically involves speculating or guessing the digits of the quotient. For example, M. Ercegovac, in *Digital Systems and Hardware/Firmware Algorithms* (1985), describes an algorithm of two positive integers designated as dividend Y and divisor X resulting in quotient Q and an integer remainder Z having the relation Y=XQ+Z. The division process is defined by the following recurrence relationship:

$$z^{(0)}=Y$$

$$z^{(j+1)}=rz(j)-Xr^n Q_{n-1-j} \text{ for } j=0, \ldots, n-1.$$

This relationship yields $$z^{(n)}=r^n(Y-XQ)$$

$$Y=XQ+z^{(n)}r^{-n}$$

The dividend Y contains 2n digits and the divisor X has n digits to produce a quotient Q with n digits and a remainder $Z=z^{(n)}r^{-n}$. A quotient digit is selected such that $0 \leq Z \leq X$ at each step (j, j+1, etc.) in the division process. The quotient digit selection process is a crucial part of the division algorithm.

One well-known division algorithm is the so-called "SRT" algorithm developed by Sweeney, Robertson, and Tocher. The SRT algorithm can be used by a computer to calculate the quotient of two integers or floating-point numbers as well as the square root of a single integer or floating-point number. While the SRT division algorithm can be performed either by hardware or software, hardware implementation is generally preferred due to faster speeds and lower costs.

The SRT algorithm can be accelerated by data processing techniques such as pipelining and parallel processing. Pipelining increases the level of concurrency (i.e., the number of activities performed simultaneously) in an algorithm by breaking a large task into multiple smaller tasks carried out concurrently by sequential stages of the single hardware unit. Parallel processing, on the other hand, increases the amount of concurrency by performing larger tasks simultaneously in separate hardware units.

SUMMARY OF THE INVENTION

In accordance with the present invention, an improved division/square root circuit accelerates the SRT algorithm for division and square root operations relating to integers or floating-point numbers by performing quotient-digit prediction across the entire clock cycle. Minimization of the number of gate delays per quotient digit generated is achieved through the use of triply-redundant representation of the partial remainder and a fully-overlapped quotient digit prediction scheme suitable for logic implementation.

To achieve these and other advantages in accordance with the purpose of the present invention, as embodied and broadly described herein, a circuit is provided for determining a quotient of a divisor and a dividend represented in binary signals or the square root of a radicand represented in binary signals. This circuit, according to the present invention, includes a partial remainder data path having a plurality of serially-connected partial remainder stages including a first partial remainder stage in the data path for receiving predetermined quantities including a first partial remainder, a first divisor, and first partial quotient values. The circuit produces as outputs a second partial remainder, a second divisor, and a second partial quotient values. Those outputs are input to the one of the partial remainder stages immediately following the first partial remainder stage in the data path.

The partial remainder data path also has successive partial remainder stages in the data path for receiving as inputs a preceding partial remainder, a preceding divisor, and preceding partial quotient values from the one of the partial remainder stages immediately preceding the partial remainder stage in the data path. The successive partial remainder stages produce as outputs a successive partial remainder, a successive divisor, and successive partial quotient values, wherein the outputs are input to the partial remainder stage immediately following each of the partial remainder stage in the data path.

In addition, the circuit employs a plurality of fully overlapped quotient digit selection paths, each path comprising a plurality of serially-connected quotient digit stages, the selection paths include a first quotient digit selection path having a first quotient digit stage receiving as inputs predetermined quantities including the first partial remainder, the first partial remainder plus the first divisor, and the first partial remainder minus the first divisor. Successive quotient digit stages receive as an input the quotient digit selected from the quotient digit stage immediately preceding each of the quotient digit stages in the first quotient digit selection path and produce as an output a successive quotient digit that is input into the quotient digit stage immediately following each of the quotient digit stages in the first quotient digit selection path. A final quotient digit stage in the first quotient digit selection path produces as an output a quotient digit for selecting new partial remainder candidates in a corresponding partial remainder stage in the partial remainder data path.

The quotient digit selection paths also include successively staggered quotient digit selection paths having a first quotient digit stage receiving as an input a partial remainder output from the corresponding partial remainder stage in the series of partial remainder stages in the partial remainder data path. Successive quotient digit stages receive as an input a quotient digit selected from the quotient digit stage immediately preceding each of said quotient digit stages in each selection path and produce as an output a new quotient digit that is input into the quotient digit stage immediately following each of said quotient digit stages in the selection path. A final quotient digit stage in each selection path produces as an output a quotient digit for selecting a new partial remainder in a corresponding partial remainder stage in the partial remainder data path. This pipelined overlap scheme allows for overlap of every quotient digit prediction during the clock cycle and minimizes the number of gate delays per quotient digit generated.

In another aspect, a circuit is provided for determining a quotient of a divisor and a dividend represented in binary signals or the square root of a radicand represented in binary signals. This circuit, according to the present invention, includes a partial remainder data path having a plurality of serially-connected partial remainder stages, including a first partial remainder stage in the data path for receiving predetermined quantities including a first divisor, a first partial remainder, the first partial remainder plus the first divisor, the first partial remainder minus the first divisor, and first partial quotient values. The first partial remainder path also produces as outputs a plurality of second partial remainder candidates, a second divisor, and second partial quotient values, wherein the outputs are input to the one of said partial remainder stages immediately following the first partial remainder stage in the data path.

The partial remainder data path also has successive partial remainder stages in the data path for receiving as inputs a preceding divisor, a preceding partial remainder, the preceding partial remainder plus the preceding divisor, and the preceding partial remainder minus the preceding divisor, the last three quantities being selected from the plurality of partial remainder candidates output from the partial remainder stage immediately preceding each of said partial remainder stages in the data path. The successive partial remainder stages produce as outputs successive partial remainder candidates, a successive divisor, and successive partial quotient values, wherein the outputs are input to the partial remainder stage immediately following each of the partial remainder stages in the data path. This triply-redundant scheme for the partial remainder data path allows for easier speculative quotient-digit predictions.

Additionally, the circuit includes a plurality of quotient digit selection paths, each path producing as an output a quotient digit for selecting new partial remainder candidates in a corresponding partial remainder stage in the partial remainder data path.

In another aspect, a method is provided for determining the quotient of a divisor and a dividend or the square root of a radicand represented in binary signals. This method, according to the present invention, includes the steps of receiving predetermined quantities including the divisor, a partial remainder, the partial remainder plus the divisor, the partial remainder minus the divisor, partial quotient values, performing a plurality of overlapping speculative computations of quotient digits and developing new partial remainder quantities. The performing step further includes the steps of computing a first quotient digit based on the predetermined quantities, performing a speculative computation for each successive quotient digit based on the predetermined quantities to produce a plurality of quotient digit candidates, and selecting one of the plurality of quotient digit candidates for each of the successive quotient digits based on the previously selected quotient digit.

In another aspect a method is provided for determining the quotient of a divisor and a dividend or the square root of a radicand represented in binary signals. This method, according to the present invention, includes the steps of receiving predetermined quantities including the divisor, a partial remainder, the partial remainder plus the divisor, the partial remainder minus the divisor, partial quotient values, performing a plurality of overlapping speculative computations of quotient digits, and developing new partial remainder quantities. The developing step further including the steps of formulating a first plurality of partial remainder candidates based on the predetermined quantities; selecting the first plurality of partial remainder candidates based on the corresponding quotient digit to produce new partial remainder quantities; formulating successive pluralities of partial remainder candidates, based on the new partial remainder quantities previously selected; selecting the successive plurality of partial remainder candidates based on the corresponding quotient digit to produce new partial remainder quantities.

In another aspect, a computer system is provided which, according to the present invention, includes a computer processor, a memory operatively coupled to the computer processor, and a computer circuit, for determining a quotient of a divisor and a dividend represented in binary signals or the square root of a radicand represented in binary signals, having a partial remainder data path having a plurality of serially-connected partial remainder stages and a plurality of fully overlapped quotient digit selection paths.

It is understood that both the foregoing general description and the followed detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and together with the description serve to explain the principles of the invention. In the drawings.

DETAILED DESCRIPTION

A. Improved Computer-Implementation of the SRT Algorithm

Figure 1:
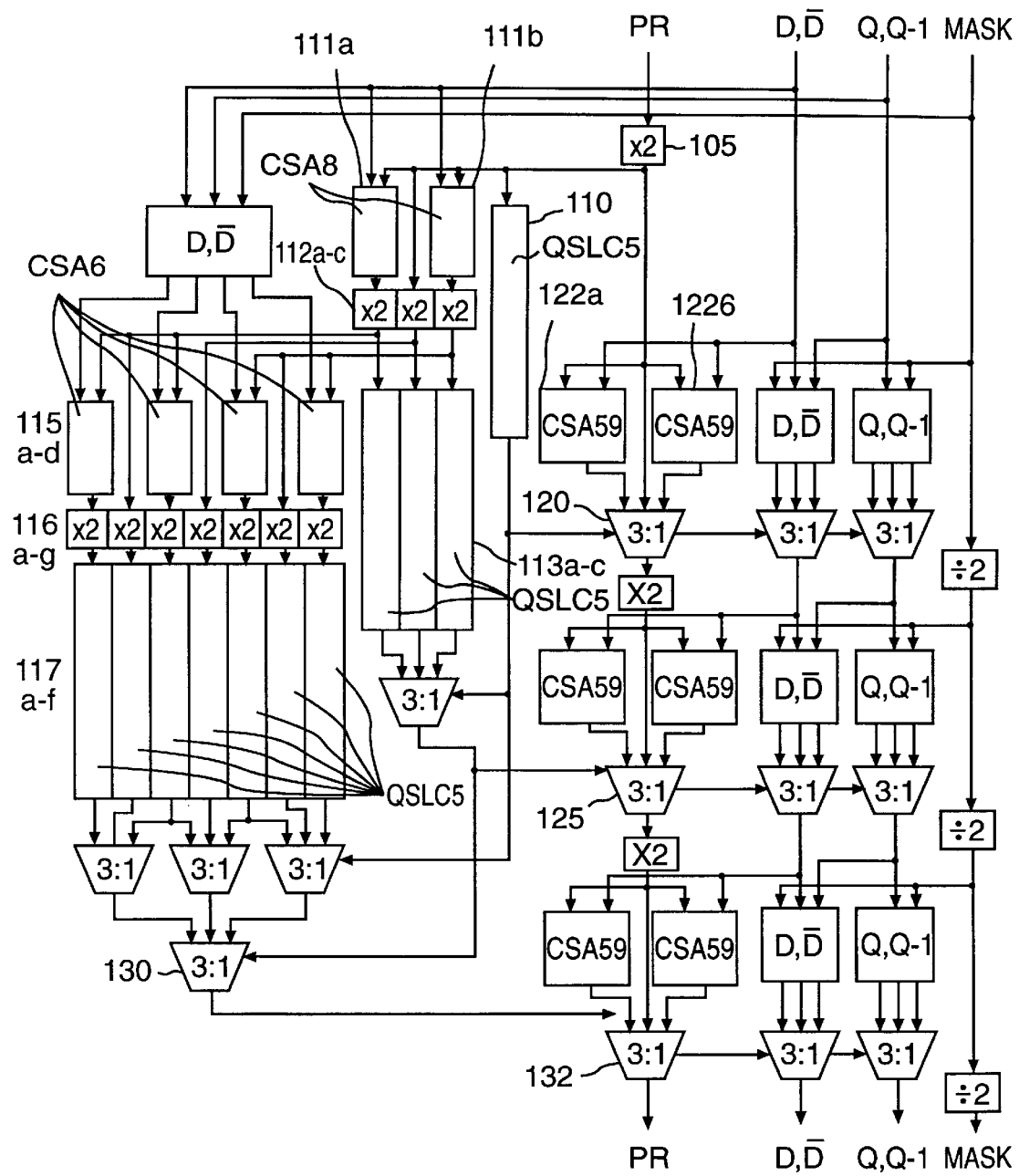
FIG. 1 is a schematic diagram showing the logical structure of the UltraSPARC™ division/square root circuit.

To facilitate appreciation of the present invention, certain concepts related to computer implementation of the SRT algorithm are now described. FIG. 1 shows an improved SRT division/square root circuit employed in Sun Microsystem's UltraSPARC™ systems. Background information regarding the SPARC™ architecture may be found in *The SPARC Architecture Manual* (David L. Weaver and Tom Germond eds., Prentice-Hall 1994). (Note that Sun, Sun Microsystems, and the Sun Logo are trademarks or registered trademarks of Sun Microsystems, Inc. in the United States and other countries. UltraSPARC™ and all other SPARC™ trademarks are used under license and are trademarks of SPARC International, Inc. in the United States and other countries. Products bearing SPARC™ trademarks are based upon an architecture developed by Sun Microsystems, Inc.).

The division/square-root circuit in FIG. 1 uses an "overlapped" quotient-digit selection scheme in which the selection of quotient digit $q_{i+1}$ is initiated before $q_i$ is actually determined. Information about the value of digit $q_i$ is used to compute digit $q_{i+1}$, but as late as possible in the clock cycle. In addition, the circuit calculates future partial remainders (PR) according to the following equation: $PR_{i+1} = 2PR_i - q_{i+1}D$, where q is the quotient digit (−1, 0, 1), which is determined solely by the value of the previous partial remainder and is independent of the divisor D. Quotient selection is achieved through a process in which assumptions are made about the values of the next few quotient digits. These assumptions can be explored in parallel through the use of replicated hardware. For example, the circuit in FIG. 1 employs multiple copies of quotient-digit prediction logic to perform multiple speculative computations of the quotient digit for stages late in the clock cycle as well as multiplexors to select among speculative computations at the last possible instant. This quotient selection scheme is the subject of commonly assigned U.S. Pat. No. 5,696,712 to Prabhu et al. (the disclosure of which are incorporated herein by reference). Other commonly-assigned U.S. patent applications providing pertinent background information include Ser. Nos. 08/498,397, and 08/648,410.

Referring to FIG. 1, the partial remainder (PR), the divisor D and its complement D, redundant partial quotient values Q and Q−1, and a mask value are input from flip flops not shown. A multiplier 105 shifts the digits of the partial remainder by one digit position to multiply the partial remainder value by two. The digits representing the value 2PR then feed into a quotient select logic 110. Quotient select logic 110 examines the five high-order digits of the partial remainder to determine whether the next quotient digit should be −1, 0, or 1. This begins the quotient digit selection path.

During this examination, three speculative computations are undertaken for a second quotient digit. In this regard, two 8-digit carry-save adders 111a and 111b and three multipliers, 112a–c, compute the high-order digits of 2PR+D and 2PR−D. Quotient select logic 113a–c receive the digit groups representing the quantities 2(2PR+D), 2(2PR), and 2(2PR−D), respectively. In addition, seven speculative computations are also immediately initiated for a third quotient digit. In this regard, four 6-digit carry-save adders 115a–d and seven multipliers 116a–g, each of which is essentially a replication of multiplier 105, generate digit groups representing the quantities 4PR+3D, 4PR+2D, 4PR+D, 4PR, 4PR−D, 4PR−2D, and 4PR−3D. The multipliers 116a–g then input the digit groups into quotient select logic 117a–f, each of which is essentially a replication of any of quotient select logic 113a–c.

The digit group representing the initial quantity 2PR also feeds directly to 3:1 multiplexer 120. This begins the partial remainder data path. Multiplexer 120 also receives inputs from two 59-digit carry-save adders 122a and 122b that hold the digit groups representing the quantities 2PR+D and 2PR−D, respectively. The first quotient digit selected by quotient select logic 110 determines which of the three 59-digit quantities input into the multiplexer 120 becomes the new partial remainder. The digit group representing either the quantity 2PR+D, 2PR, or 2PR−D is selected as the new partial remainder depending on whether the quotient digit is −1, 0, or 1, respectively. Similarly, in the next stage of the partial remainder data path, the second quotient digit is used to select one of three more 59-digit sums from multiplexor 125.

Returning now to the quotient digit select path, the first and second quotient digits feed into a cascaded multiplexer 130 to select the appropriate one of the seven speculative quotient select calculations produced by quotient select logic 117a–f as the third quotient digit. Finally, the third quotient digit determines which of three additional 59-digit sums from multiplexor 132 should be the third new partial remainder, which is then stored back into flip-flops for the next iteration of the division process. The process continues until all digits of the significant (53 or 60 digits) are computed.

Figure 2:
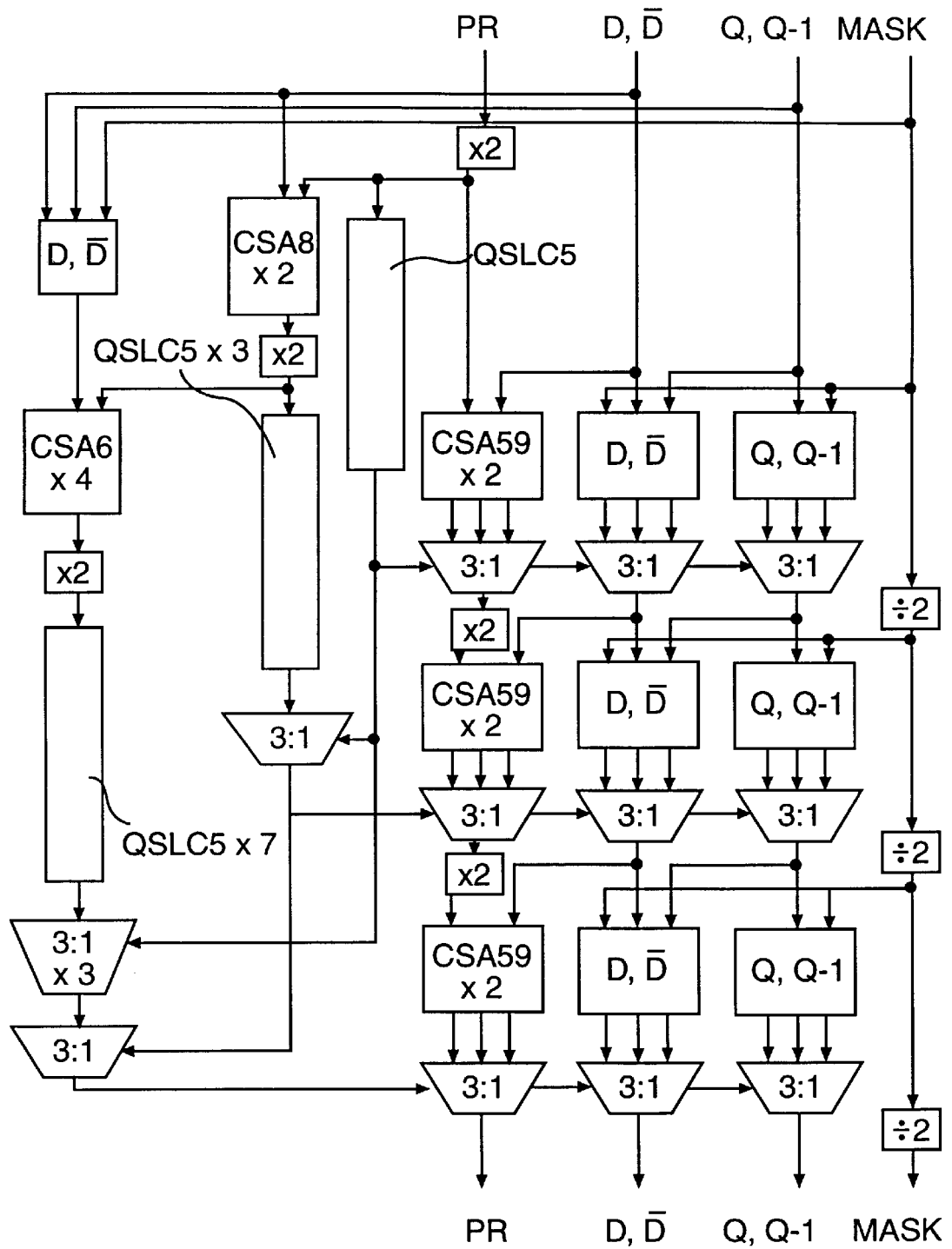
FIG. 2 is a schematic diagram showing an abbreviated structure of the UltraSPARC™ division/square root circuit.

The circuit shown in FIG. 1 computes three quotient digits in one clock cycle. The length of the critical path per clock cycle is defined by the quotient digit select path: 1×QSLC5+ 2×CSA+3×MUX=1(5)+2(1.5)+3(1)=11 gate delays. Thus, the UltraSPARC™ division/square root circuit looks two stages ahead for quotient-digit prediction and generates three digits of quotient in eleven gate delays. The circuit can be expanded to predict more quotient digits. For purposes of simplification, the logical structure depicted in FIG. 1 can be condensed as shown in FIG. 2. The notation "QSLC5×3," for example, indicates three substantially identical QSLC5 circuits. This abbreviated notation will be used in later figures.

Figure 3:
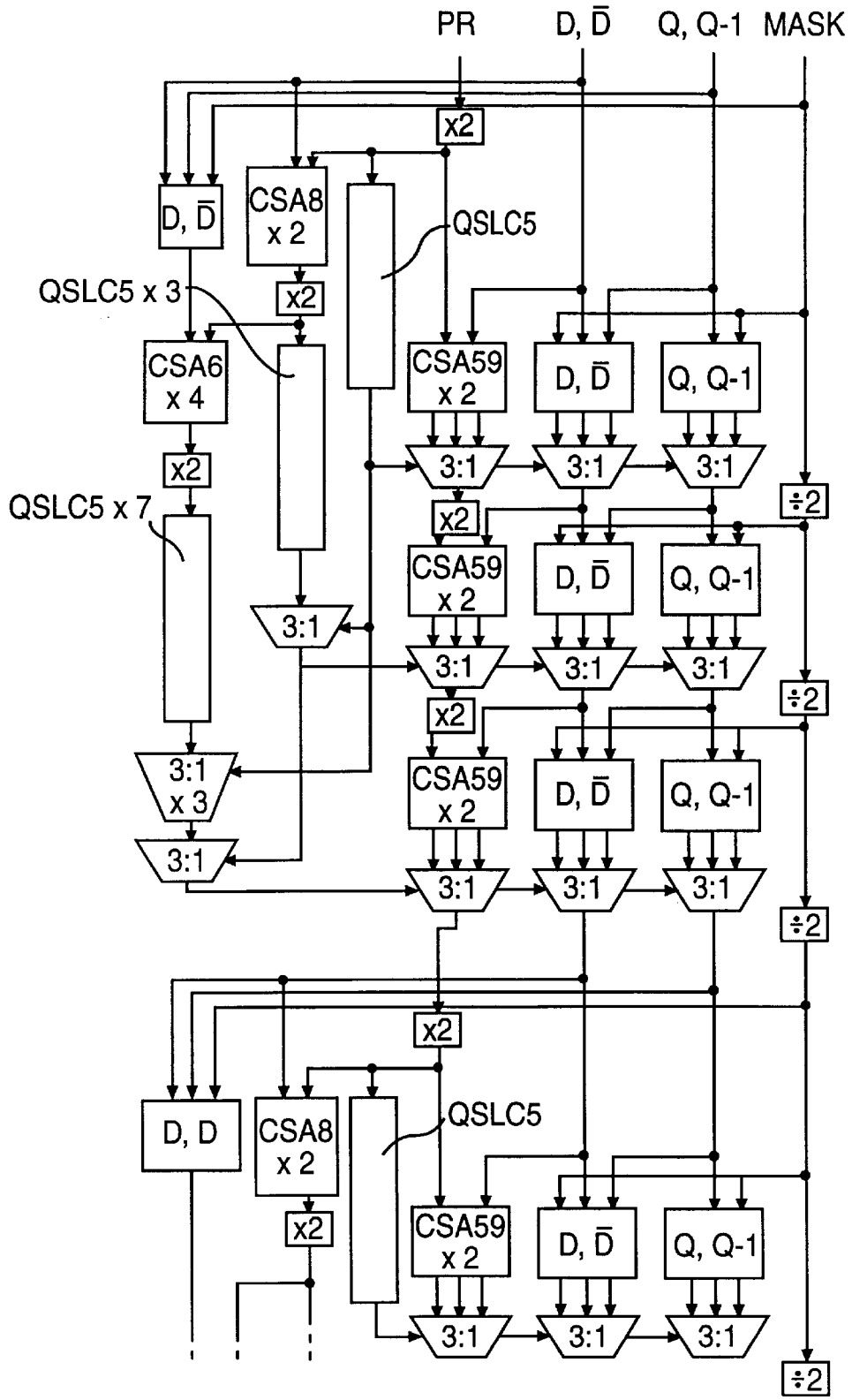
FIG. 3 is a schematic diagram showing two cascaded UltraSPARC™ division/square root circuits.
Figure 4:
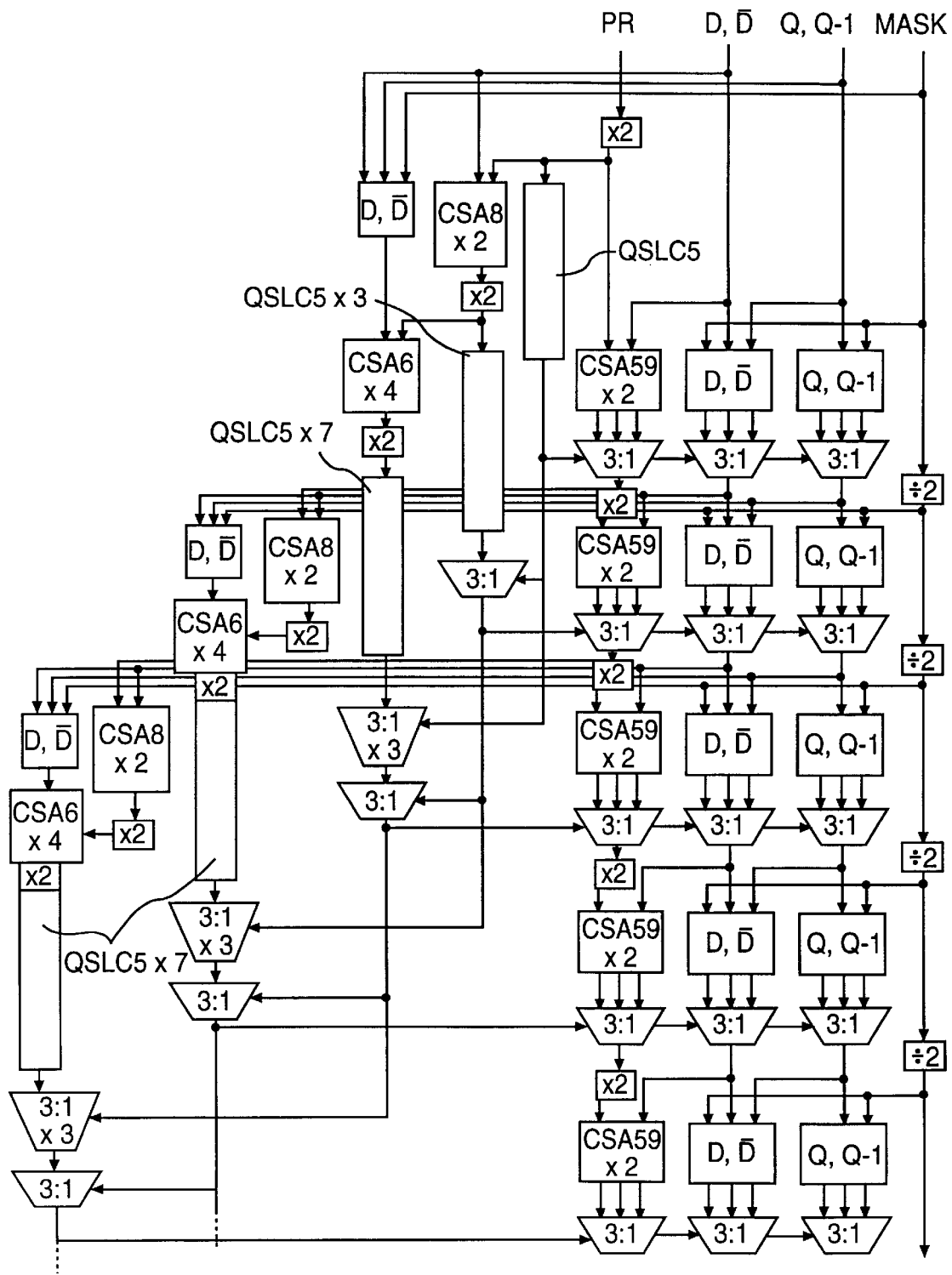
FIG. 4 is a schematic diagram showing two cascaded conventional division/square root circuits with improved overlap.

FIG. 3 shows part of a second UltraSPARC™ division/ square root circuit, cascaded from a first circuit, that generates a fourth quotient digit. Unlike the second and third quotient digits, however, selection of the fourth quotient digit is not overlapped with selection of the first quotient digit. Selection of the fourth quotient digit may be made earlier in the data path. Referring to FIG. 4, the selection of quotient digit $q_{i+3}$ can begin as soon as quotient digit $q_i$ has determined partial remainder PR. Thus, the selection of the fourth quotient digit is initiated as soon as the first new partial remainder has been computed. Despite the improved overlap of the design of FIG. 4, however, the overall delay would not be reduced because the quotient select logic is still on the critical path. Accordingly, there exists a need for a division/square root circuit capable of computing multiple quotient digits per clock cycle with less delay.

Reference will now be made in detail to the various embodiments of the present invention, examples of which are illustrated in the accompanying drawings. Wherever possible, the same reference numbers will be used throughout the drawings to refer to the same or like parts.

B. Overlap of Quotient Digit Selection

Figure 5:
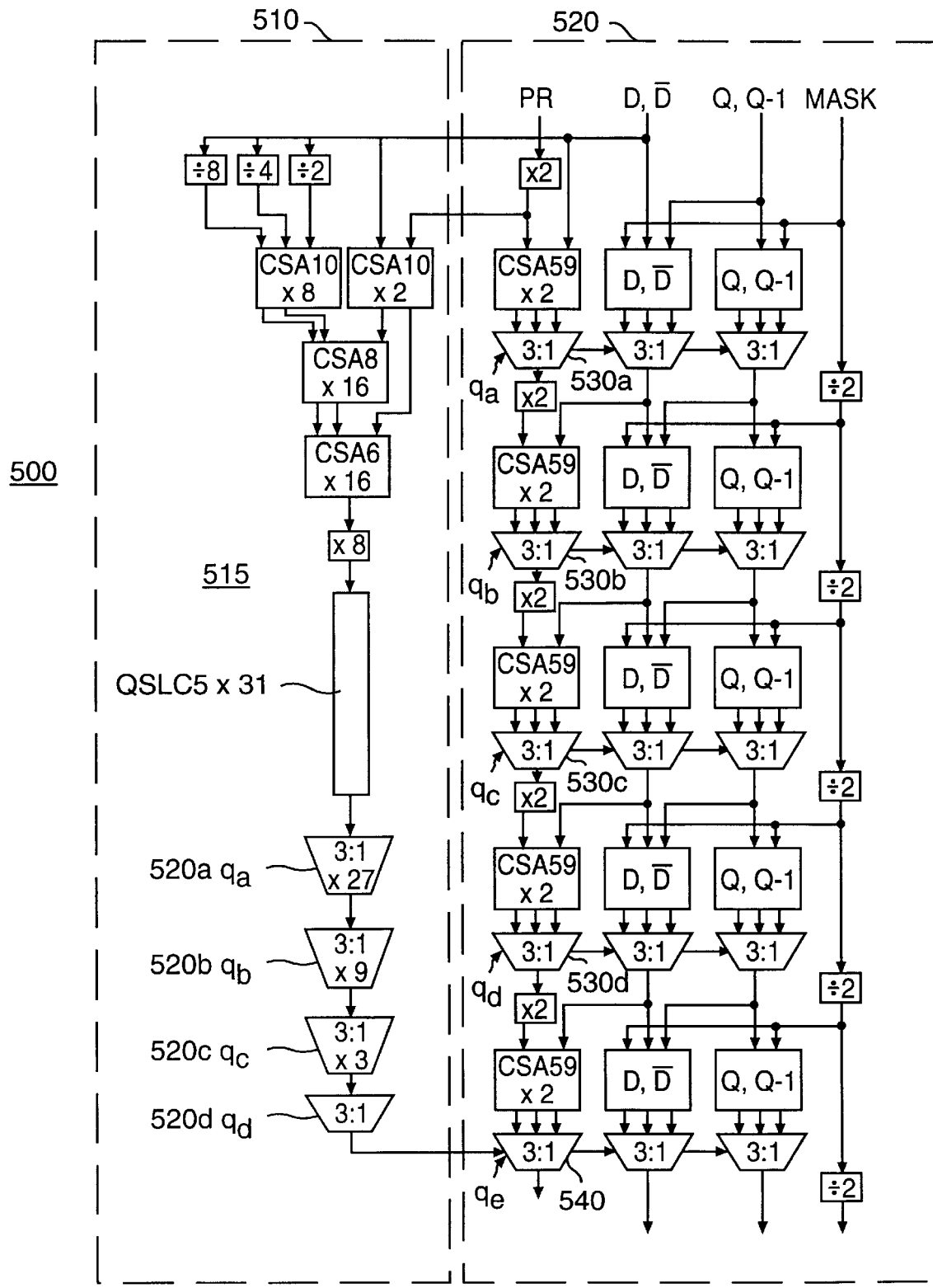
FIG. 5 is a schematic diagram showing a division/square root circuit with five-stage lookahead in accordance with an embodiment of the present invention.

The circuit 500 shown in FIG. 5 places the quotient digit selection path 510 off the critical path by predicting future quotient digits far enough in advance. Starting from partial remainder $PR_i$, the circuit initiates speculative predictions of the quotient digit that will select partial remainder $PR_{i+5}$ using thirty-one quotient digit selection logic circuits 515. In this design, data in the quotient digit selection path 510 encounters just as many multiplexor layers (5 layers: 520a–d and 540) as data in the primary partial remainder data path 520 (5 layers: 530a–d and 540). As a result, quotient digit selection can be achieved by performing four additions with only three levels of CSA delay.

Figure 6:
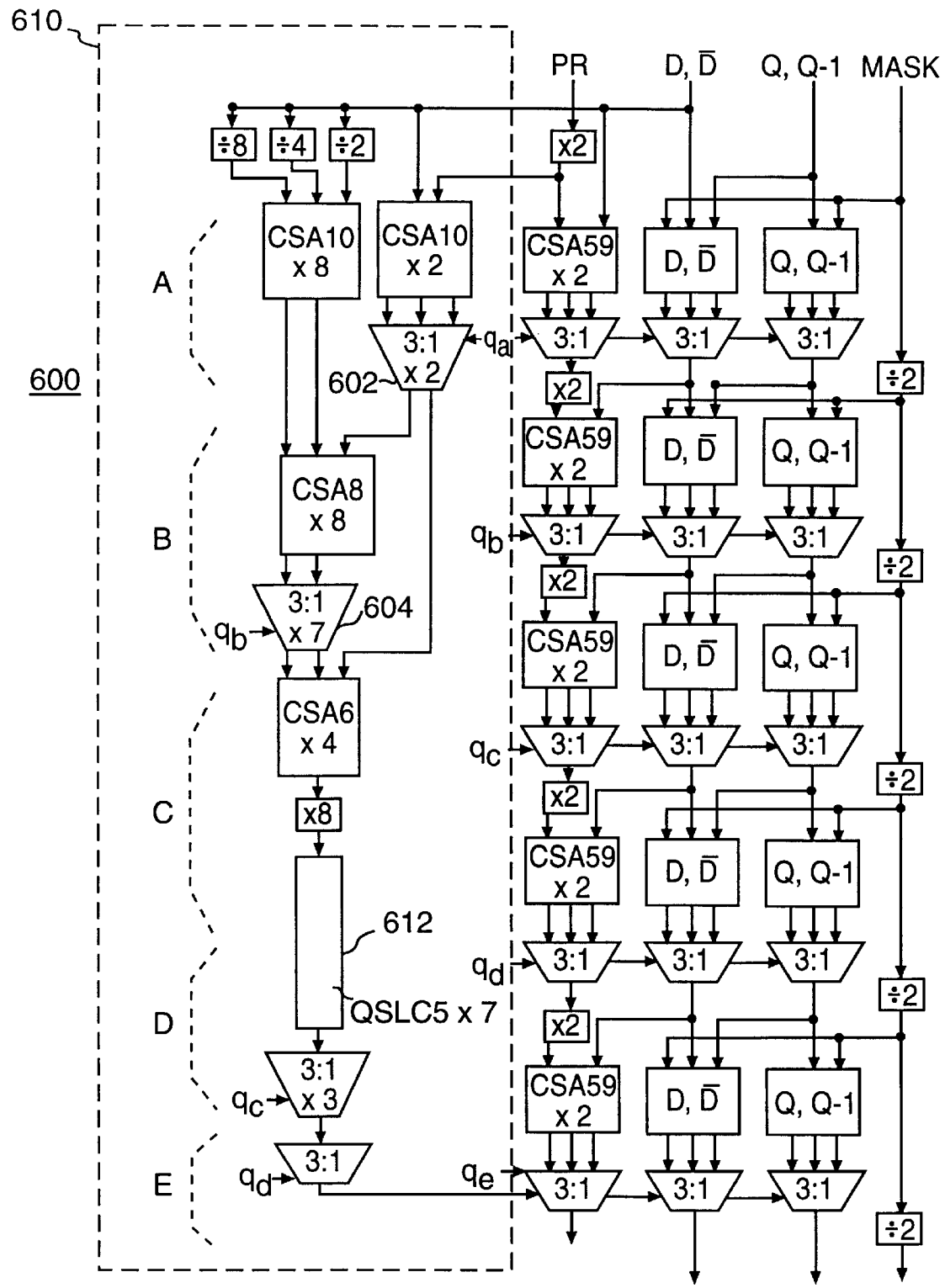
FIG. 6 is a schematic diagram showing a division/square root circuit wit lookahead and improved multiplexor placement in accordance with an embodiment of the present invention.

The amount of quotient select logic can be greatly reduced by moving the multiplexor of the quotient digit selection path to as early a point in the path as possible. As shown in FIG. 6, by moving multiplexor groups 602 and 604 earlier in quotient digit selection path 610, only seven substantially identical QSLC5 circuits 612 are needed instead of thirty one. The total estimated delay of the circuits 500 and 600 shown in FIGS. 5 and 6, respectively, is calculated as 1×QSLC5+3×CSA+5×MUX=1(5)+3(1.5)+5 (1)=13.5 gate delays for five quotient digits or 2.7 gate delays per quotient digit, comparable to the 2.5 gate delays per quotient digit on the partial remainder data path. In comparison, the standard UltraSPARC™ circuit exhibits 11 gate delays for three quotient digits or 3.66 gate delays per quotient digit. The improved delay of 13.5 gate delays is a reasonable amount of logic computation to fit into one clock cycle in a RISC design.

Figure 7:
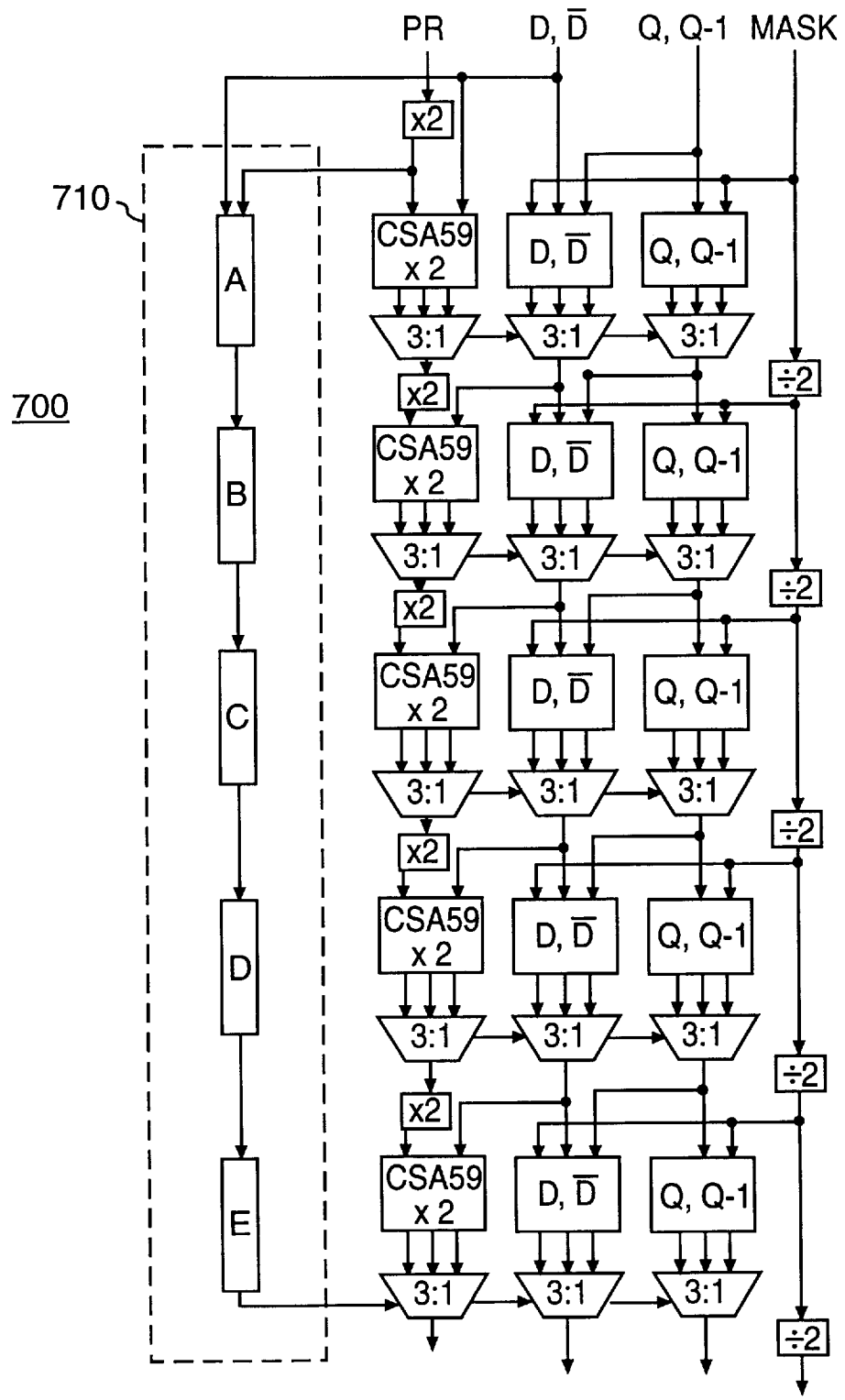
FIG. 7 is a schematic diagram showing an abbreviated structure of a division/square root circuit with five-stage lookahead and improved multiplexor placement in accordance with an embodiment of the present invention.
Figure 8:
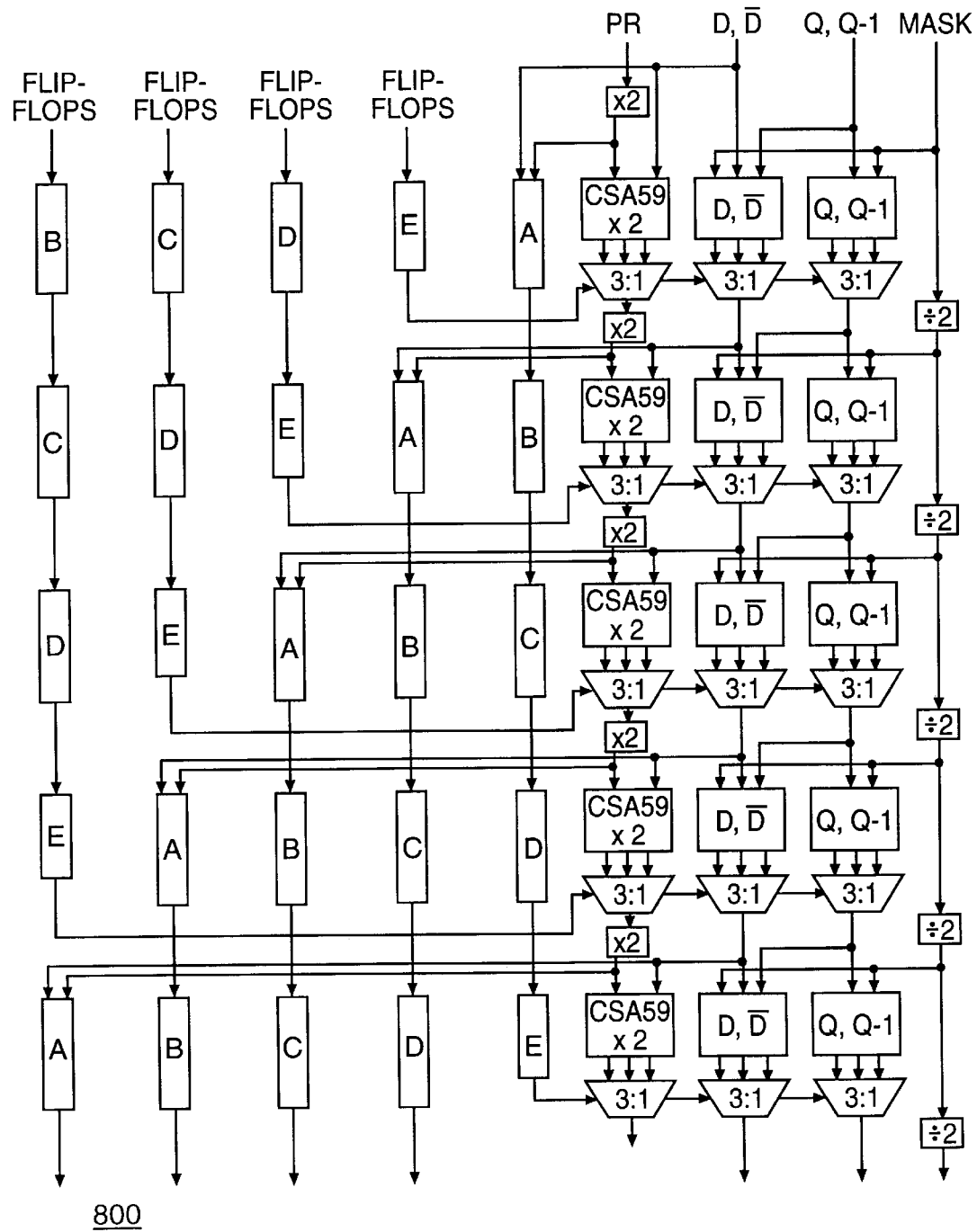
FIG. 8 is a schematic diagram showing a division/square root circuit with five-stage lookahead and fully pipelined overlap in accordance with an embodiment of the present invention.

The computation of the quotient digits $q_a$, $q_b$, $q_c$, $q_d$, and $q_e$ can be accomplished essentially in two steps. Referring to FIG. 7, the circuit 700 breaks the quotient digit selection path 710 into five blocks, A, B, C, D, and E, of approximately equal delay. In accordance with the present invention, five substantially identical quotient select logic circuits are then arranged in a staggered pipelined fashion as shown in FIG. 8, providing a fully overlapped quotient digit selection system. The total delay of circuit 800 is likely to be somewhat greater than 13.5 gate delays but less than or equal to 15 gate delays, depending on how evenly-matched are the respective delays of the logic blocks A, B, C, D, and E.

Figure 9:
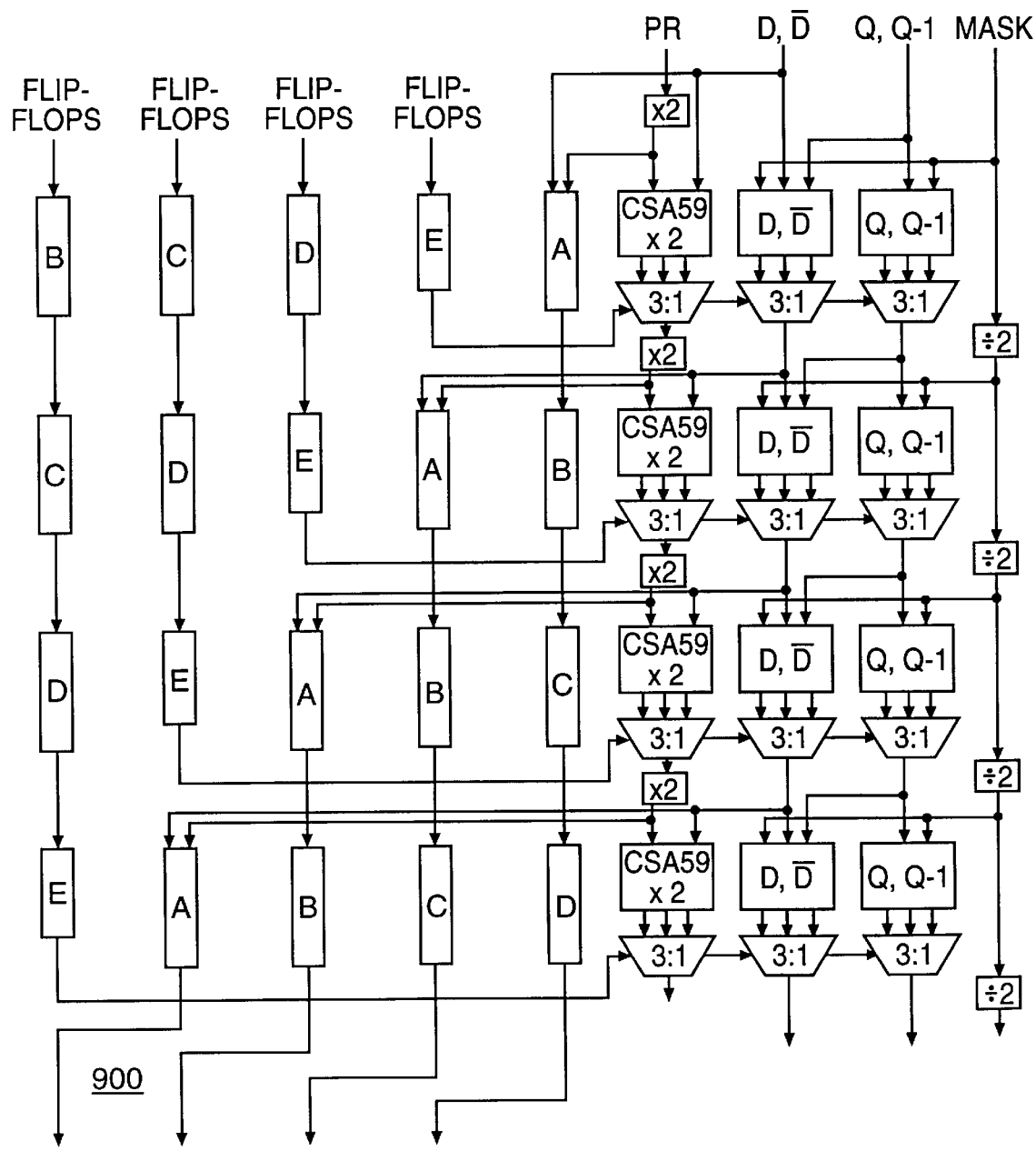
FIG. 9 is a schematic diagram showing a division/square root circuit with five-stage lookahead and four stages per clock in accordance with an embodiment of the present invention.
Figure 10:
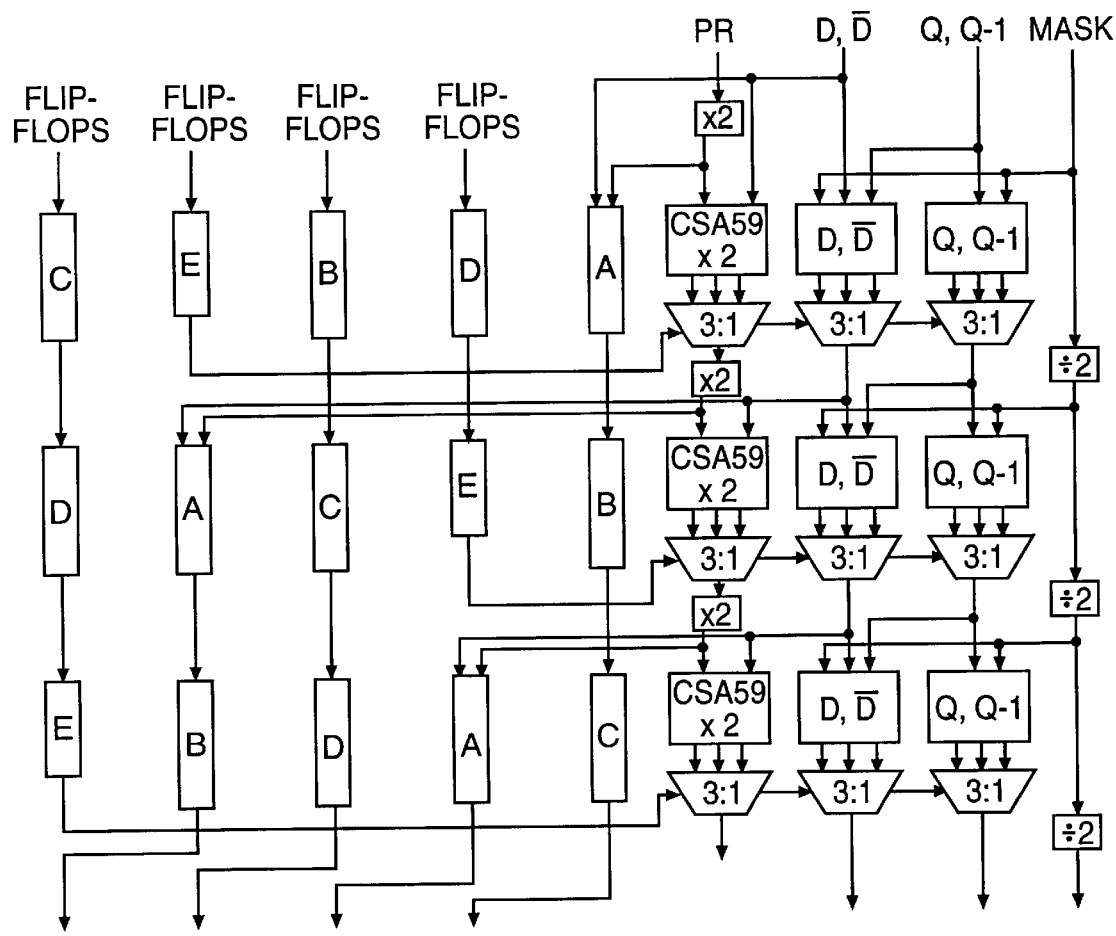
FIG. 10 is a schematic diagram showing a division/square root circuit with five-stage lookahead and three stages per clock in accordance with an embodiment of the present invention.
Figure 11:
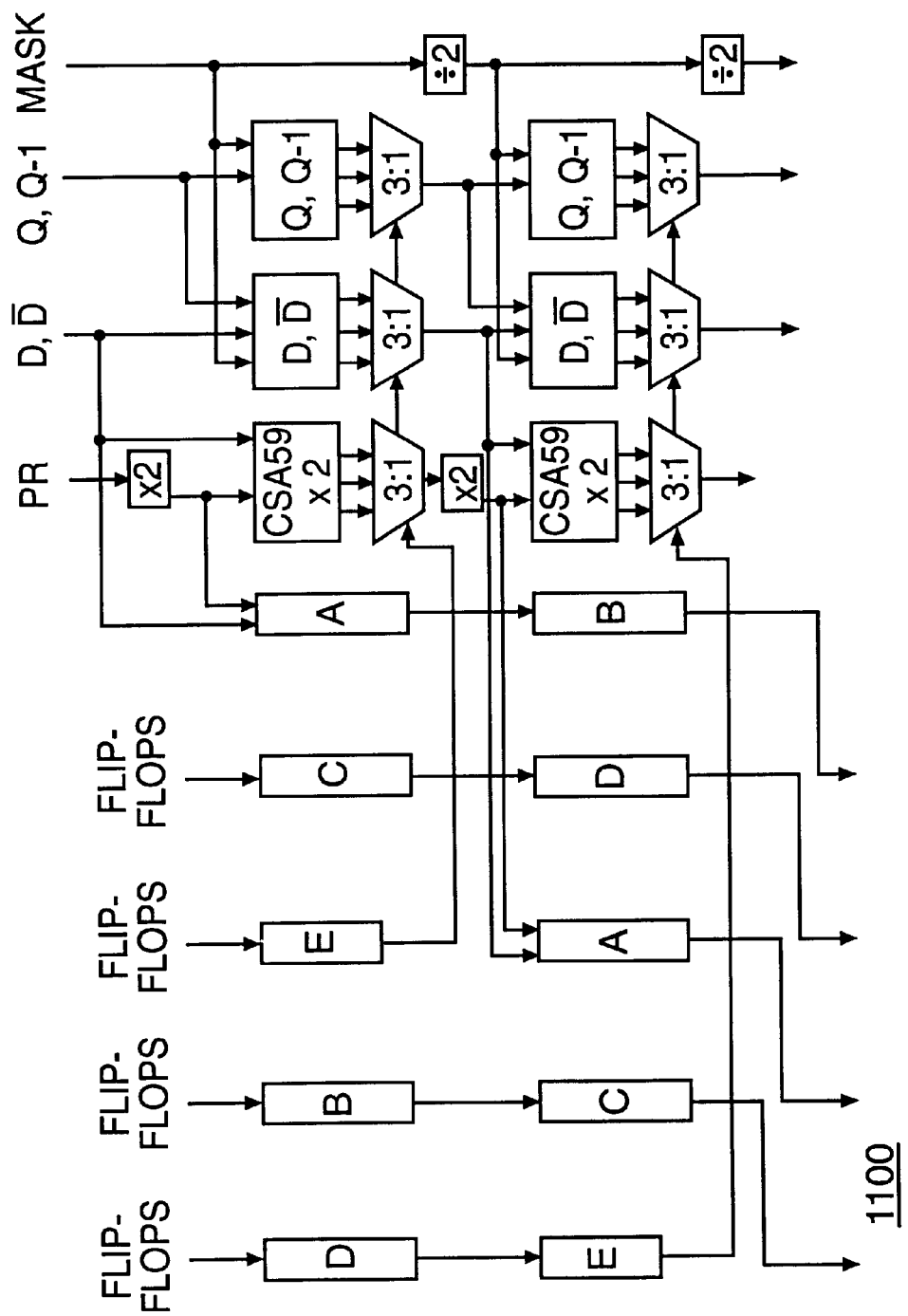
FIG. 11 is a schematic diagram showing a division/square root circuit with five-stage lookahead and two stages per clock in accordance with an embodiment of the present invention.
Figure 12:
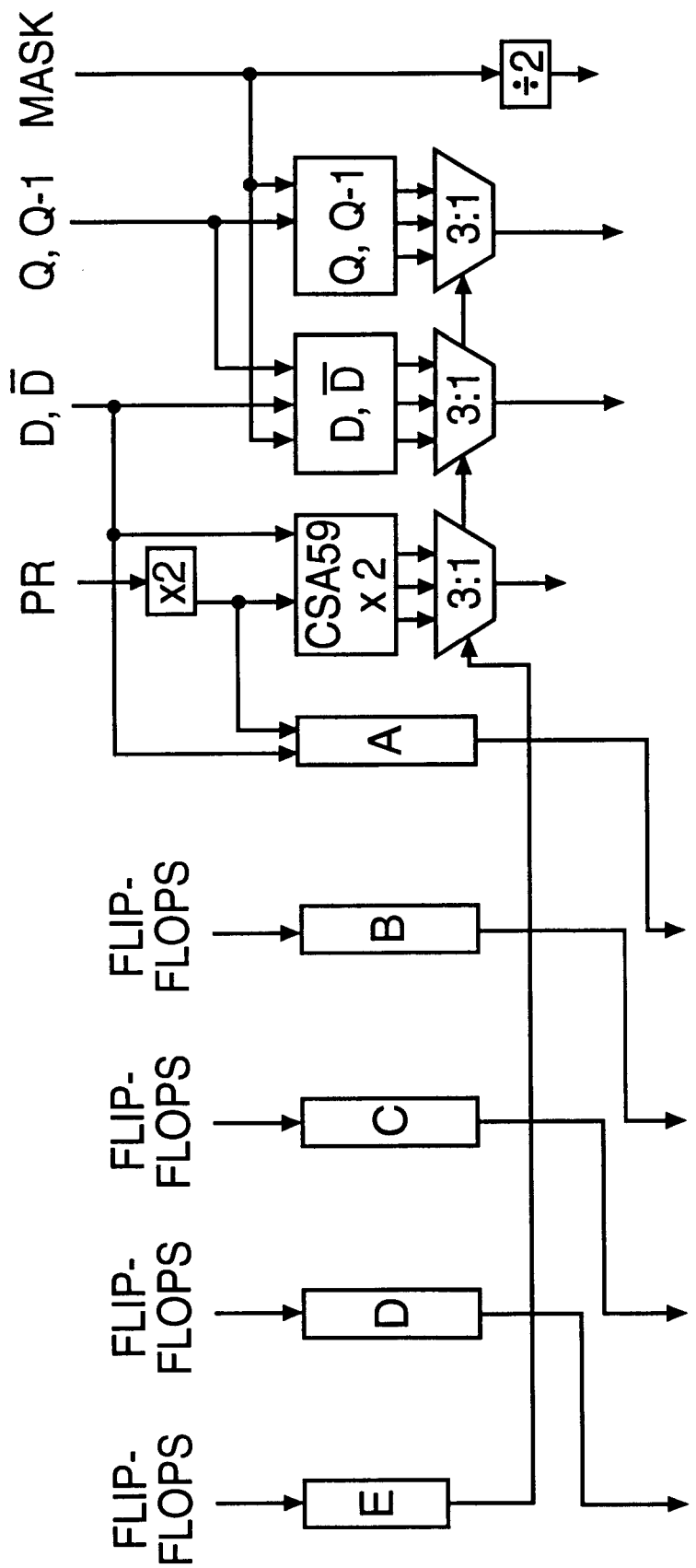
FIG. 12 is a schematic diagram showing a division/square root circuit with five-stage lookahead and one stage per clock in accordance with an embodiment of the present invention.

The number of stages per clock cycle in the partial remainder data path is easily adjustable and not dependent on the number of stages of quotient-digit lookahead. All that is necessary is to latch enough intermediate values of the lookahead computation at the end of each clock cycle. For example, FIG. 9 shows a circuit 900 with the same five-stage lookahead circuitry but only four stages per clock cycle. This arrangement has a delay of about 12 gate delays. FIG. 10 shows a circuit 1000 with the same five-stage lookahead circuitry but only three stages per clock cycle, resulting in a delay of about 9 gate delays. FIG. 11 shows a circuit 1100 with the same five-stage lookahead circuitry but only two stages per clock cycle, resulting in a delay of about 6 gate delays. Finally, FIG. 12 shows a circuit 1200 with only one stage per clock cycle, resulting in a delay of about 3 gate delays. Thus, the arrangements shown in these figures generally allow the generation of one quotient digit approximately every 3 gate delays. This delay per quotient digit ratio can be further improved according to another aspect of the present invention.

C. Triple Redundancy of Partial Remainder

Figure 13:
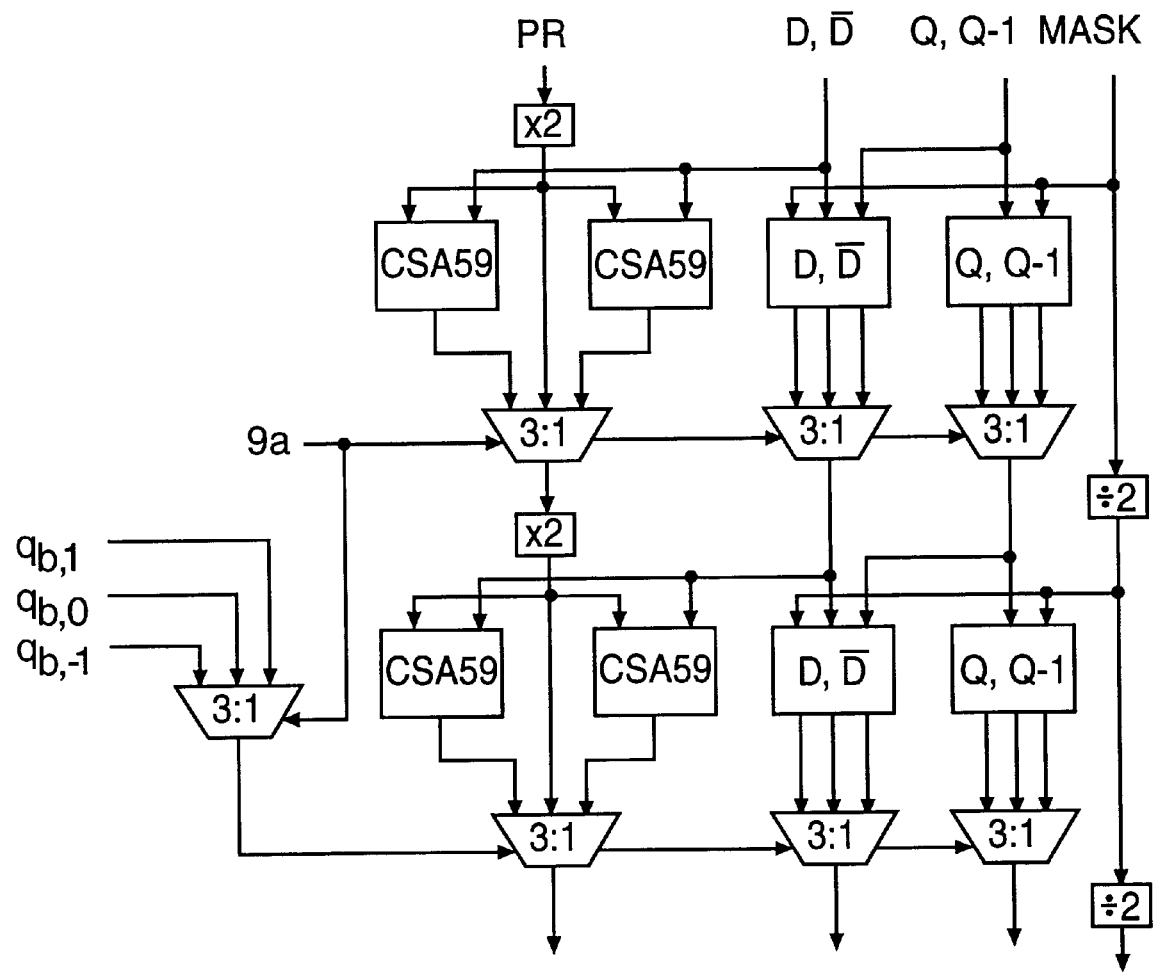
FIG. 13 is a schematic diagram showing a portion of the UltraSPARC™ division/square root circuit.
Figure 14:
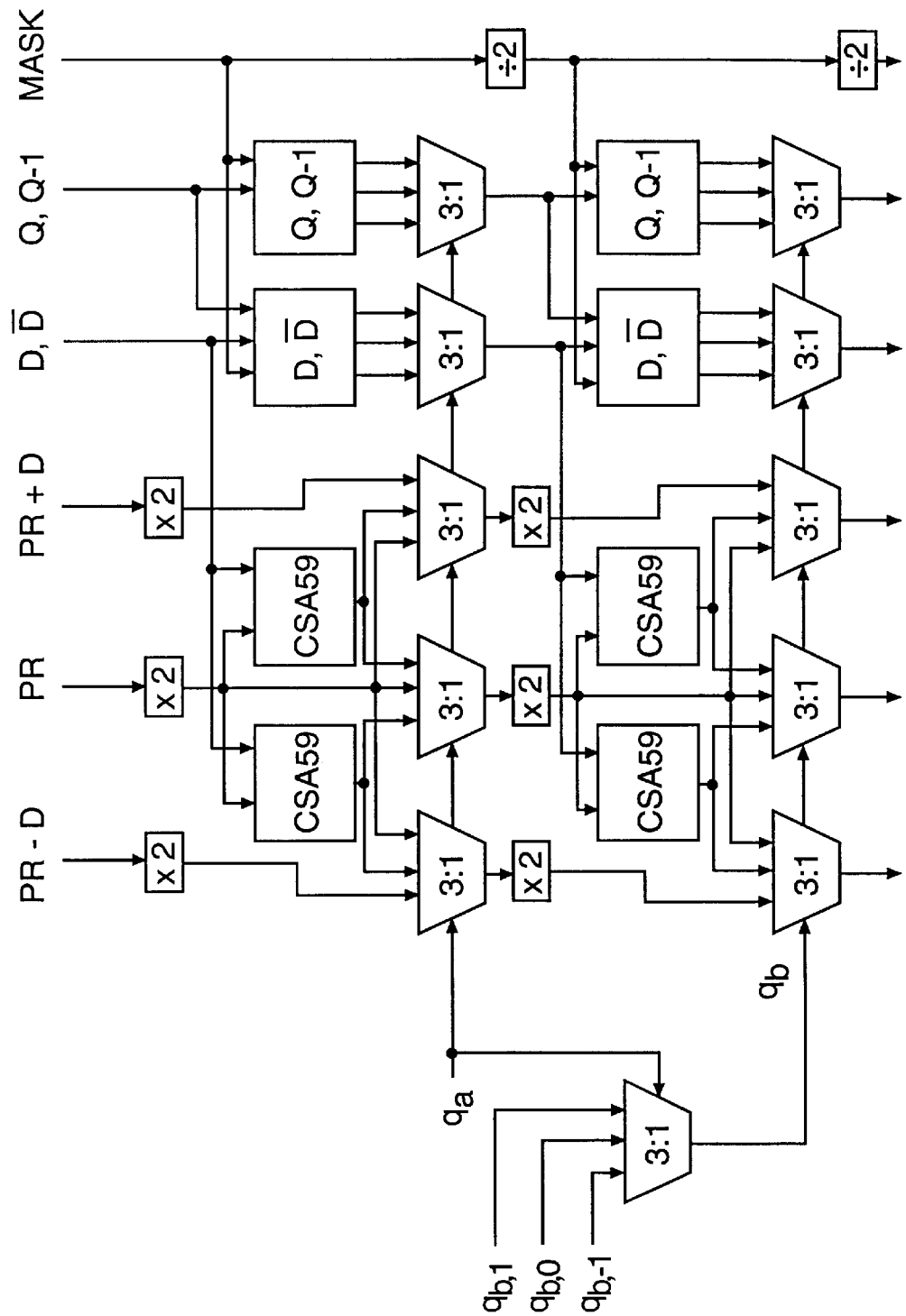
FIG. 14 is a schematic diagram showing a radix-2 division/square root circuit with triply redundant partial remainder in accordance with an embodiment of the present invention.

FIG. 13 shows a portion of a division/square root circuit relating to the partial remainder data path. In FIG. 14, this partial remainder data path has been modified in accordance with the present invention to utilize triply redundant representation for partial remainders in accordance with the present invention. In a simple radix-2 step, the quantities PR+D and PR−D are input into the circuit in addition to PR. These quantities are processed to produce five quantities 2PR+2D, 2PR+D, 2PR, 2PR−D, and 2PR−2D. Three of these five quantities are carried forward depending on the value of the selected quotient digit. If the quotient digit is −1, then the first three quantities are carried forward; if the quotient digit is 0, then the middle three quantities are carried forward; and if the quotient digit is 1, then the last three quantities are carried forward.

In the conventional UltraSPARC™ design, the quotient select function examines five digit positions of the partial remainder to guarantee that when the division is exact, the remainder will be non-negative (i.e., zero). Without this guarantee, the quotient could be too large by 1 and the partial remainder would equal the negative of the divisor. That situation can be compensated by the redundant representation of the partial quotient, Q−1. But determining whether the partial remainder equals the negative of the divisor requires another additional step, which would add too much delay to the system.

In accordance with the present invention such delay is avoided. With triple redundant partial remainder representation, PR+D is available to ensure that the partial remainder does not equal the negative of the divisor. Zero-detection is performed on both PR and PR+D at the same time that sign detection is performed on PR. The result of the sign detection determines which of the two zero-detections should be used to indicate whether the division was exact.

As a result of triply redundant remainder representation, a simpler quotient selection logic can be used that examines only four digit positions of the partial remainder, rather than five digit positions as in the UltraSPARC™ circuit. As shown in FIG. 6, the quotient selection logic QSLC5 may be replaced by smaller, faster quotient selection logic QSLC4. This translates into reduction in delay from 13.5 to 13 gate delays, a savings of about a one-half gate delay. Moreover, in the circuit shown in FIG. 5 and 6, it was necessary to perform up to three additions to the partial remainder in the quotient digit select path, resulting in three stages of CSA delay. By using triply redundant representation, which starts with the quantities PR±D, the circuit of FIG. 14 requires only two stages of CSA delay. This reduces the delay along the quotient-digit select path by an additional 1.5 gate delays, resulting in a delay of about 11.5 gate delays. In other words, quotient digit selection is no longer on the critical path. Instead, the overall delay of the circuit is determined by the partial remainder computation path, which has a delay of 12.5 gate delays.

Figure 15:
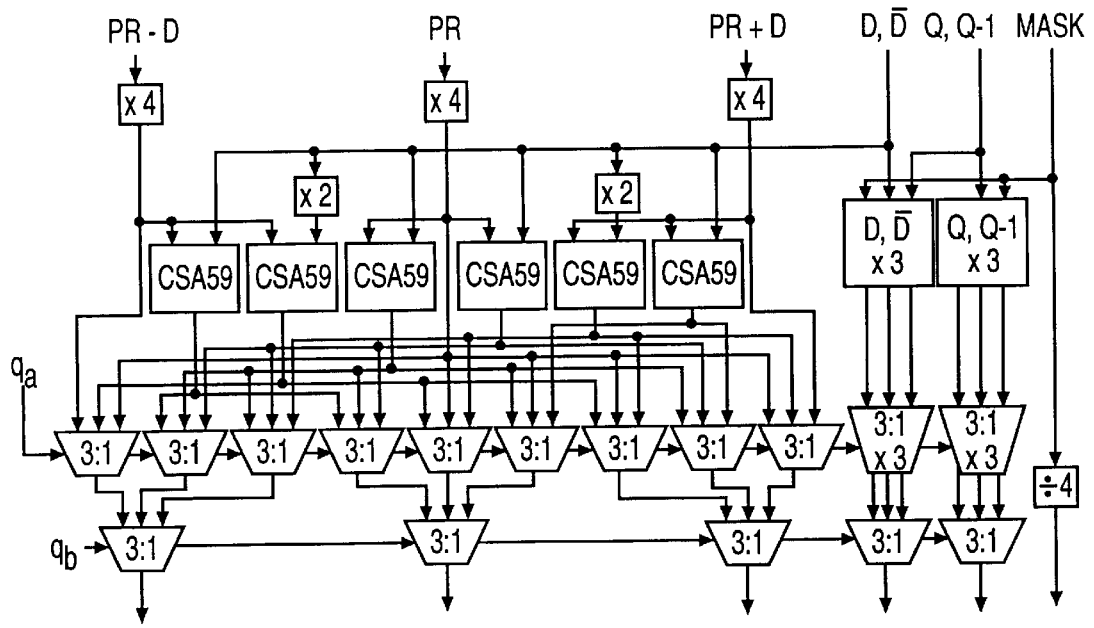
FIG. 15 is a schematic diagram showing a radix-4 division/square root circuit with triply redundant partial remainder in accordance with an embodiment of the present invention.
Figure 16:
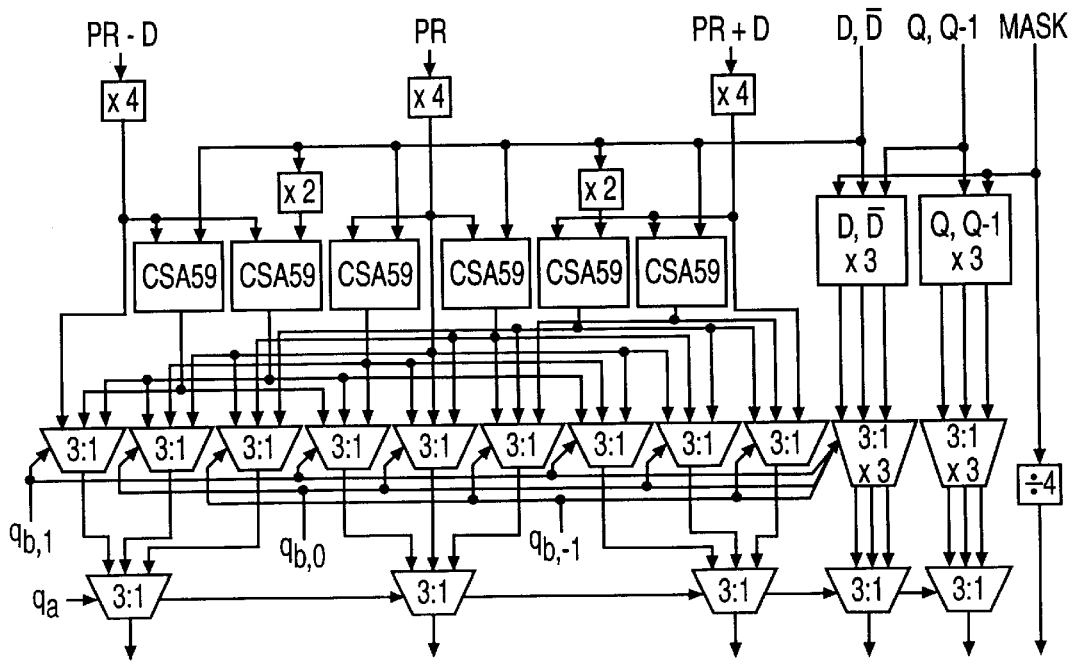
FIG. 16 is a schematic diagram showing a radix-4 division/square root circuit with redundant partial remainder and flipped multiplexor order in accordance with an embodiment of the present invention.

Although the present invention is directed at accelerating the redundant-binary-radix algorithm rather than using higher radices, certain steps performed by the circuit shown in FIG. 14 can be combined so as to appear to be radix-4. For example, two consecutive radix-2 steps in the partial remainder data path can be combined to give the effect of carrying out additions in base 4. This merger can be implemented in logic as shown in FIG. 15, where two CSA-MUX layers are combined into a single CSA-MUX-MUX layer. Note that this approach requires six 59-digit CSAs, instead of four, per each two quotient digits generated. In this approach, the quotient-digit selection path becomes the critical path again. Note also that in the configuration shown in FIG. 15, signal $q_a$ drives many multiplexors, whereas $q_b$ drives about one-third as many. Reversing the order of the multiplexors as shown in FIG. 16 balances the signal load without incurring any further delay.

Figure 17:
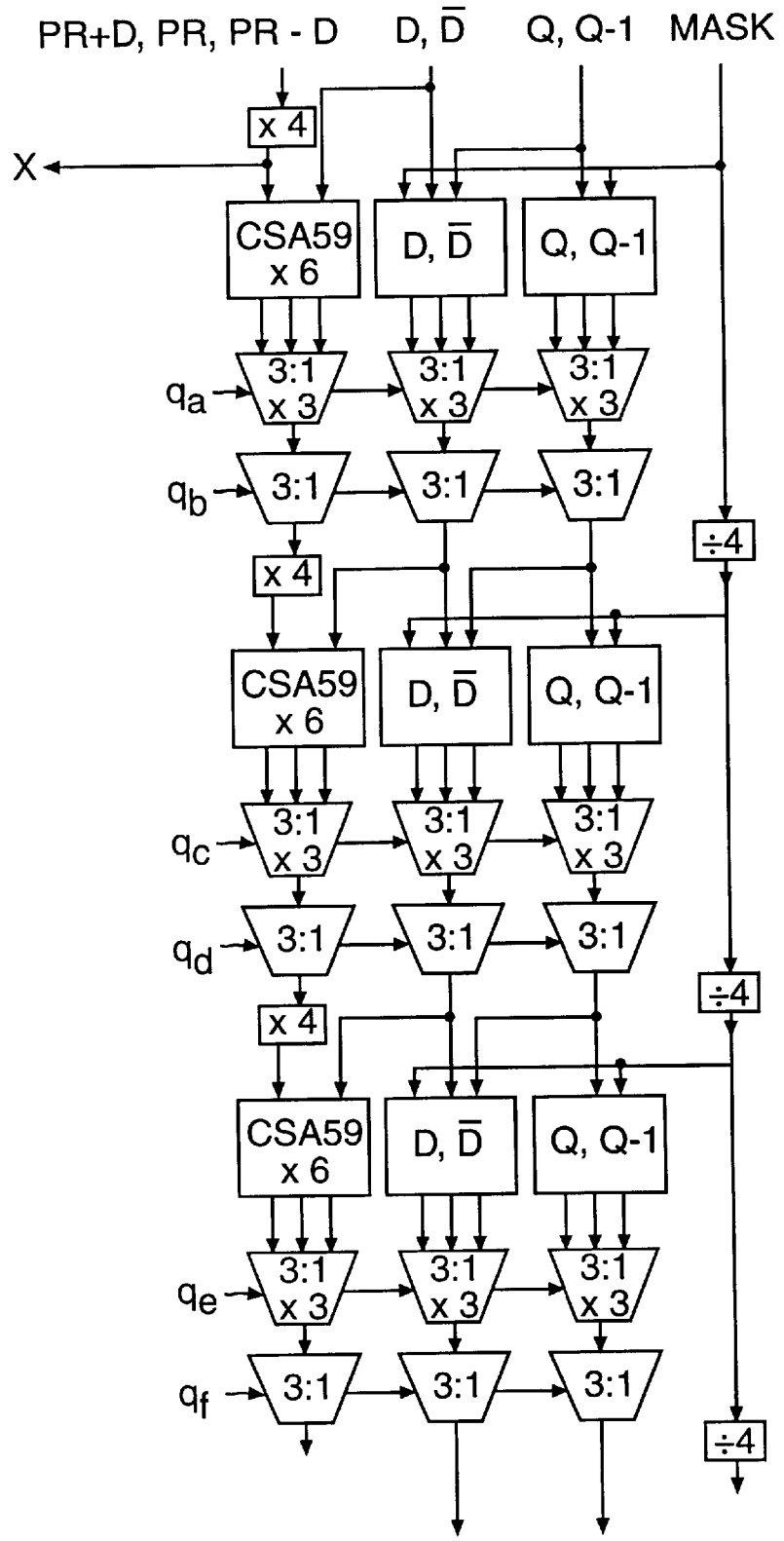
FIG. 17 is a schematic diagram showing a division/square root circuit with triply redundant remainder and six-stage lookahead in accordance with an embodiment of the present invention.

In accordance with the present invention, FIG. 17 shows a division/square root circuit using triply redundant remainder representation that is capable of calculating six quotient digits per clock cycle. If the quotient selection design shown in FIG. 5 were extended to look six binary stages ahead instead of five, the hardware required would be fairly extensive. Sharing logic and moving multiplexors earlier in the data path, however, reduces the amount of hardware needed.

D. Implementation of Quotient Digit Selection Overlap and Triple PR Redundancy

Figure 18:
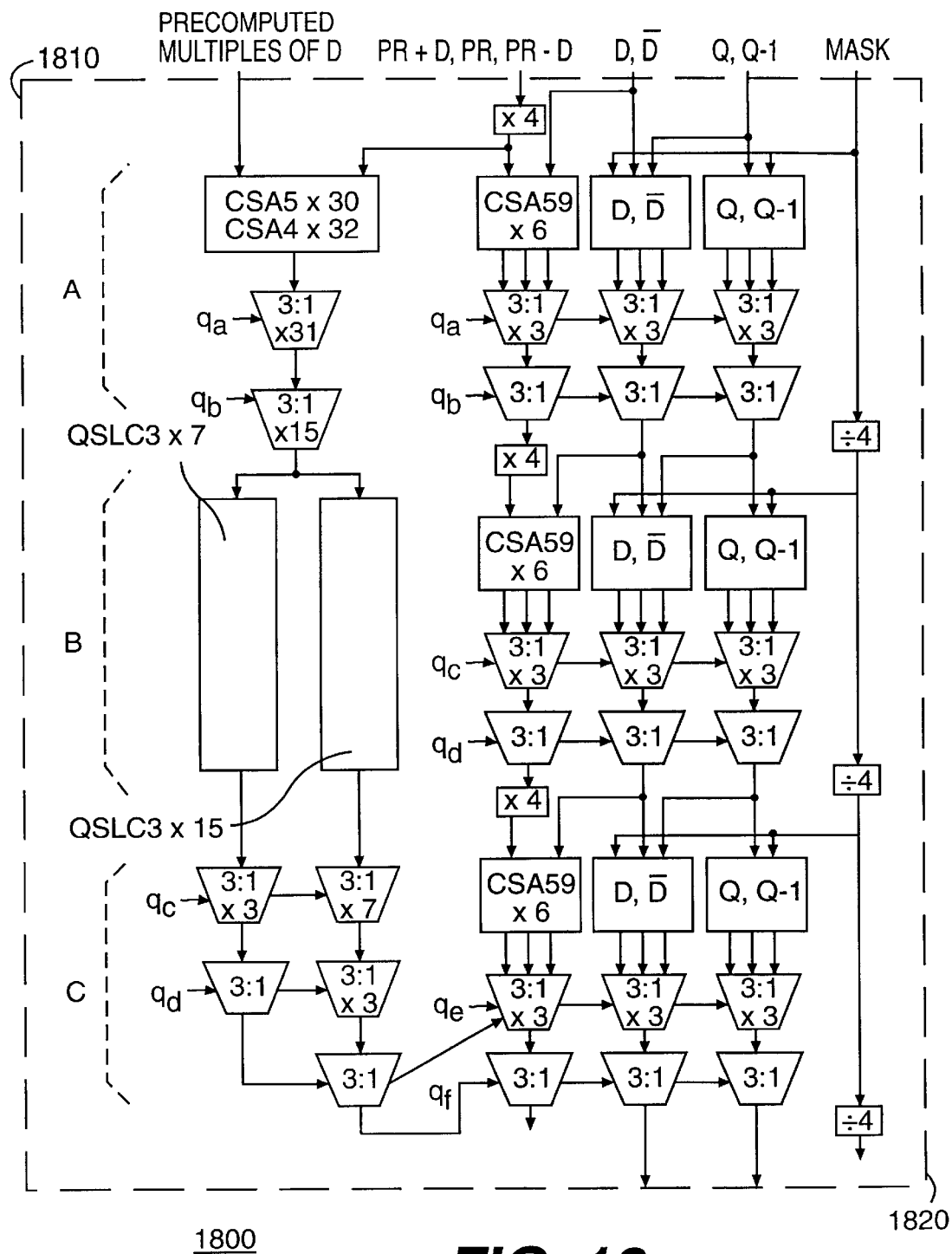
FIG. 18 is a schematic diagram showing a division/square root circuit with a six-stage lookahead quotient select logic in accordance with an embodiment of the present invention.
Figure 19:
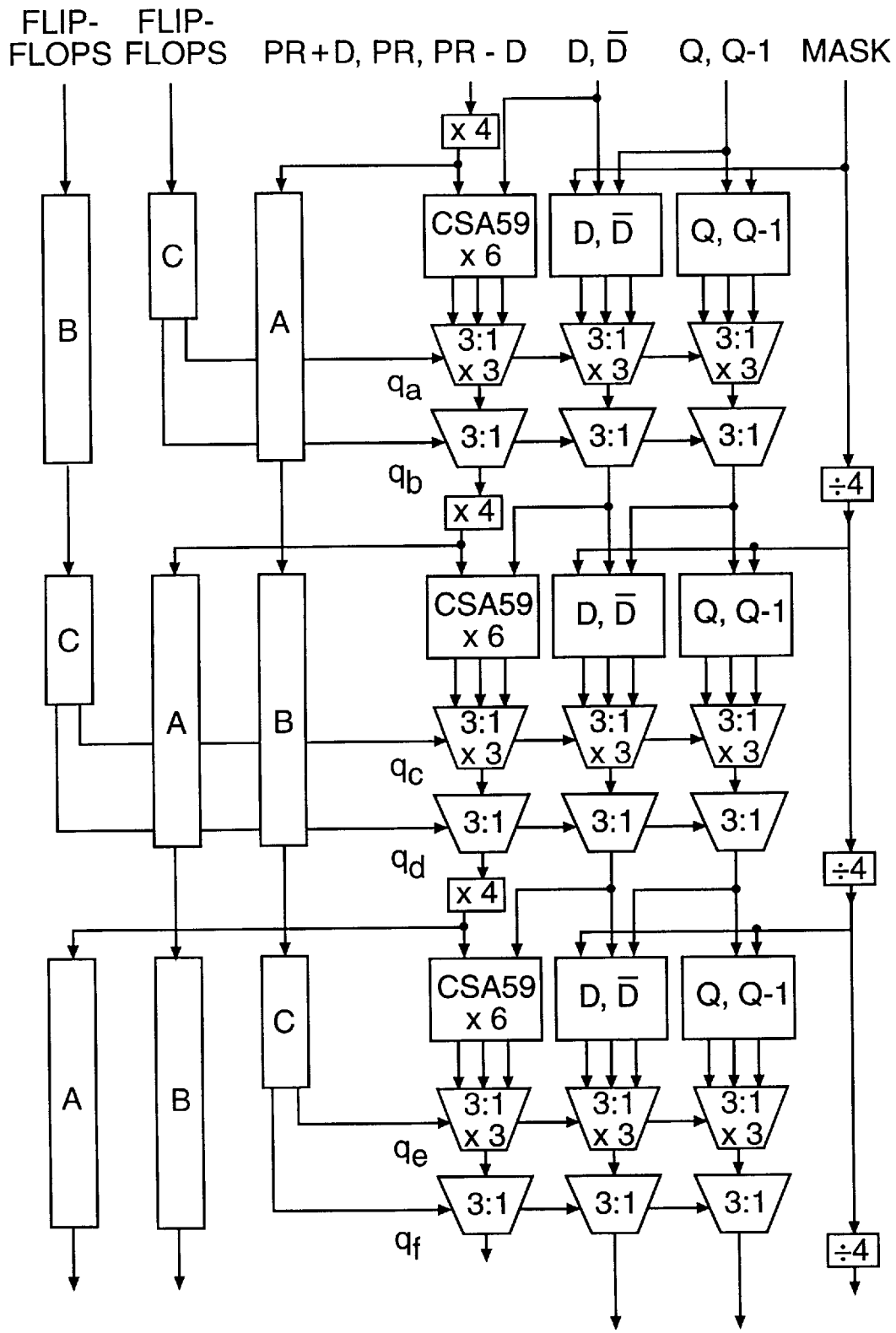
FIG. 19 is a schematic diagram showing an abbreviated structure of a division/square root circuit with six-stage lookahead and six stages per clock in accordance with an embodiment of the present invention.
Figure 20:
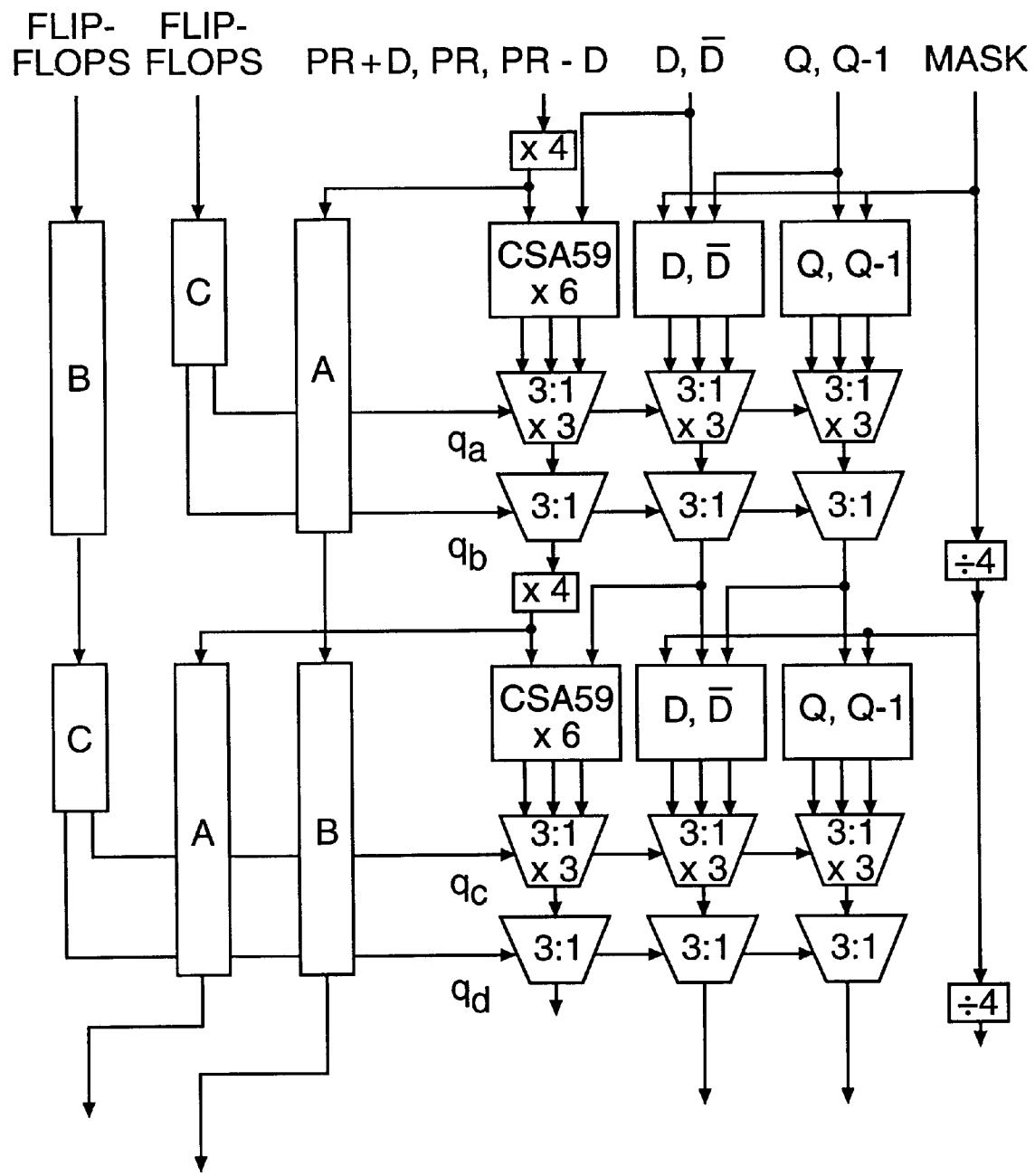
FIG. 20 is a schematic diagram showing an abbreviated structure of a division/square root circuit with six-stage lookahead and four stages per clock in accordance with an embodiment of the present invention.
Figure 21:
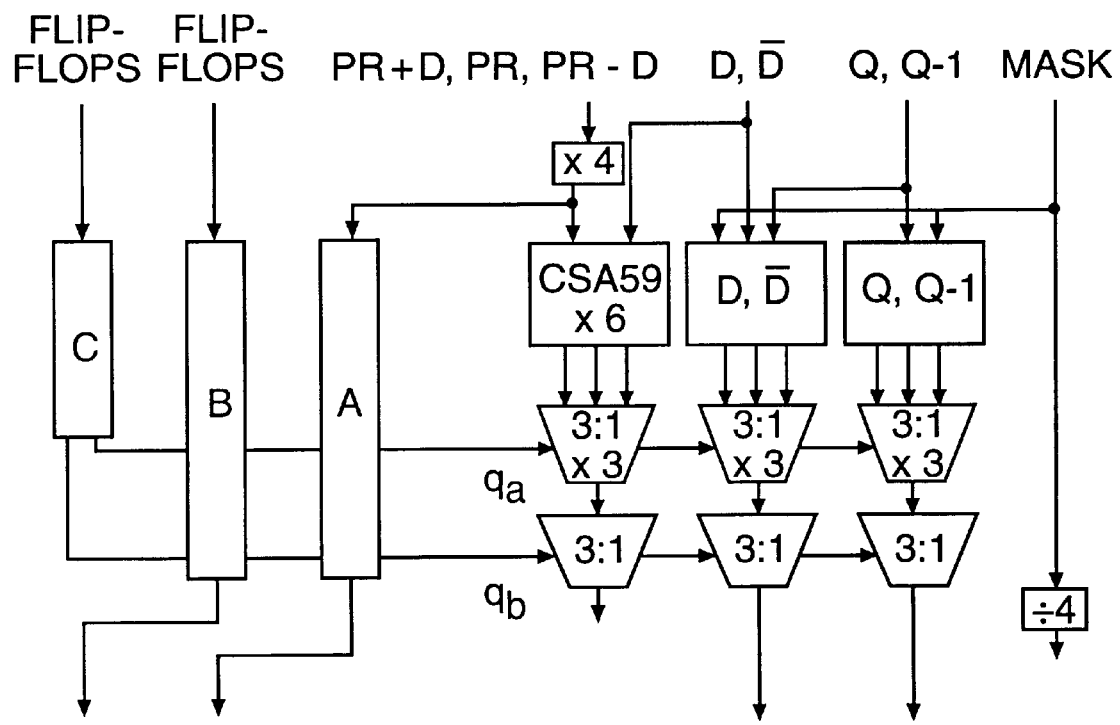
FIG. 21 is a schematic diagram showing a divide/square root circuit with six-stage lookahead with two stages per clock in accordance with an embodiment of the present invention.

FIG. 18 shows a divide/square root circuit 1800 in accordance with the present invention having a fully overlapped, six-stage quotient digit selection path 1810 and a six-stage partial remainder data path 1820 using triply redundant representation. FIG. 19 shows the same circuit with the six-stage lookahead circuitry in abbreviated form. FIG. 20 shows a variation of the circuit with six-stage lookahead circuitry and four stages in the partial remainder data path per clock. FIG. 21 shows another variation of the circuit with six-stage lookahead and two stages in the partial remainder data path per clock.

Note that the information at point X in FIG. 17 is used to compute quotient digits $q_e$ and $q_f$. The computation of $q_f$ requires three levels of CSA. Thus, the delay from point X to $q_f$ will be 3×CSA+1×QSLC5+5×MUX=3(1.5)+1(4.5)+5(1)=14. Adding the delay from the multiplexor controlled by $q_f$ and the overall delay is 15, or 2.5 gate delays per quotient digit generated—which is comparable to the five-stage lookahead design of FIG. 5.

E. Division-Only Circuit With Prescaling

Quotient digit selection can be further accelerated by abandoning the square root operation and concentrating solely upon division. That is, instead of computing a new divisor value at each stage in the partial remainder data path (necessary for the square root operation), each stage in the partial remainder data path produces a constant, fixed value for the divisor.

The quotient select logic can also be simplified by reducing the number of digits of the partial remainder that need to the examined. One approach according to the present invention is to prescale the dividend and the divisor. By multiplying the dividend and the divisor by the same quantity m, which is chosen as a function of the original divisor D, then the same quotient will be computed. Although the remainder will not be the same, its sign and "zeroness" will be the same, which is adequate for correct rounding of the quotient.

Figure 22:
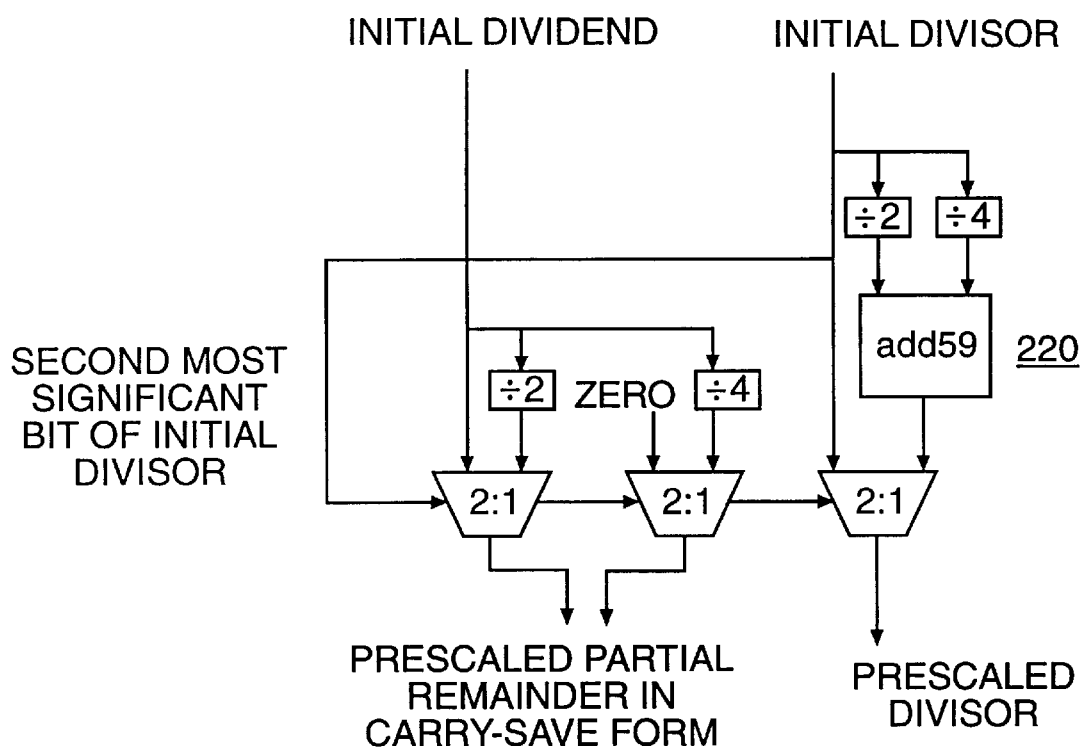
FIG. 22 is a schematic diagram showing a prescaling circuit in accordance with an embodiment of the present invention.

As an example, the dividend and divisor may be prescaled by the quantity ¾ to ensure that the divisor used is between ½ and ¾. FIG. 22 shows a prescaling circuit for performing conditional prescaling by ¾ so that the divisor will lie within the range ½ and ¾. In this circuit, the prescaling path for the divisor requires a full adder 220 because the partial remainder data path requires that the divisor be a single 59-bit number. But the prescaling path for the dividend does not require a full adder because the partial remainder data path handles the partial remainder in carry-save form, as two 59-bit quantities.

By prescaling the divisor in accordance with the present invention, the division circuit needs to produce only a three-digit estimate of a future partial remainder to produce a quotient digit. Specifically, for radix-2 division, let m=1 if ½≦D<¾, and m=¾ if ¾≦D<1. Then the new divisor D will satisfy ½≦mD<¾, and the (doubled) partial remainder 2PR at each step will always satisfy the condition −3⁄2≦2PR<3⁄2. In addition, the approximate partial remainder, obtained by truncating the carry-save representation, will always be in the set {−2, −3⁄2, −1, −½, 0, ½, 1}. As a result, only three digit positions of the partial remainder need be examined rather than four, because only two digits will be required to the left of the binary point to represent the possible partial remainder values, rather than three. One advantage of this prescaling scheme is that the multiple ¾ is particularly easy to form, requiring the addition of only two binary multiples of the original divisor.

This scaling scheme is summarized in the following table:

TABLE 1

| Scaling to the Range ½ ≦ mD < ¾ | | |
|---|---|---|
| ½ ≦ D < ¾ | m = 1 | ½ ≦ mD < ¾ |
| ¾ ≦ D < 1 | m = ¾ | 9⁄16 ≦ mD < ¾ |

Figure 23:
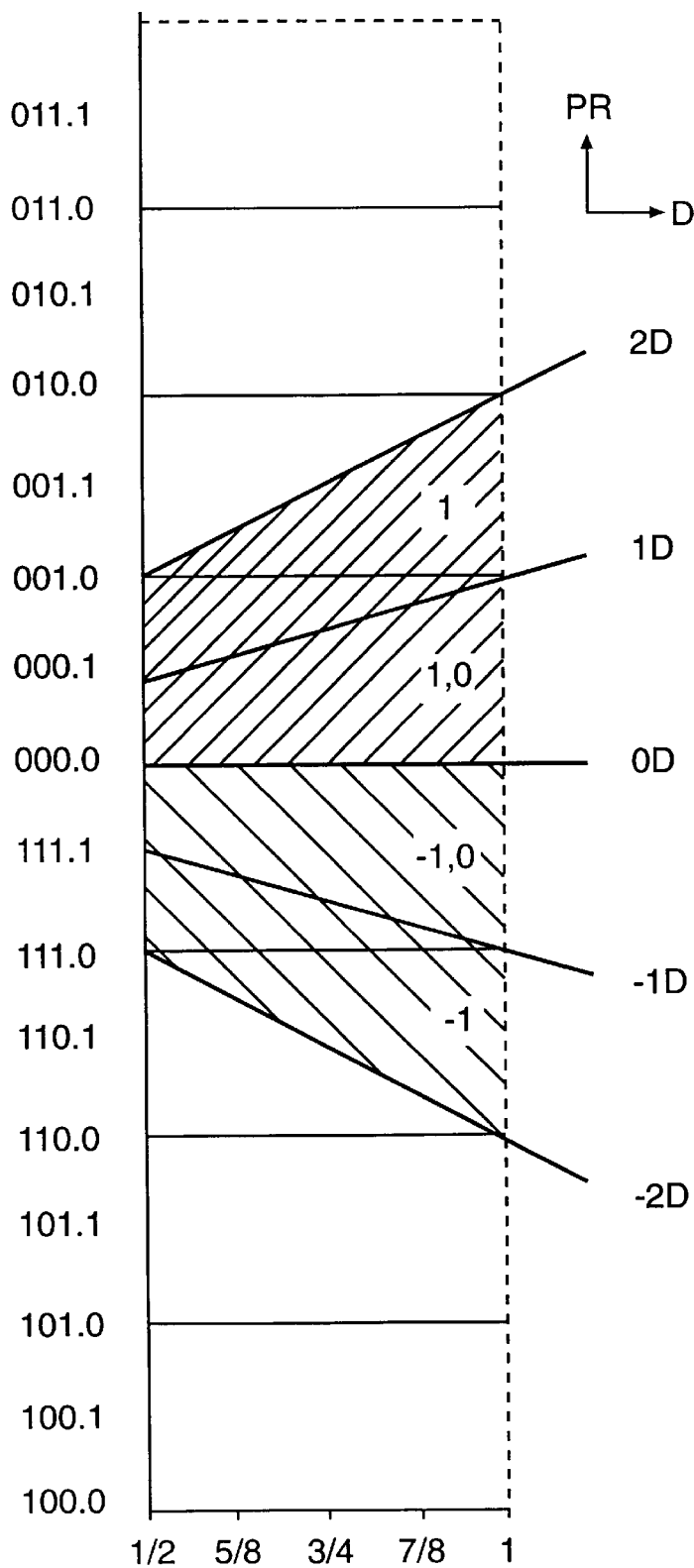
FIG. 23 is a chart showing quotient digit selection as a function of the partial remainder and the divisor.

The chart shown in FIG. 23 graphically depicts the selection of the quotient digit as a function of the first four digits of the partial remainder (the vertical axis or ordinate) and the value of the divisor (the horizontal axis or abscissa). For example, if the first four digits of the partial remainder are 1111 and the value of the divisor is 5⁄8, the quotient digit may be selected as −1 or 0. Prescaling the divisor so that it is within the range of ½ and ¾ reduces the operational range of the chart by one half. That is, only the left-hand side of the chart (defined by the abscissa range ½ to ¾) becomes relevant. As a result, quotient digit selection is made easier and faster. Furthermore, faster quotient selection is obtained when the scaled divisor lies in a range whose upper boundary is strictly less than one, for example in the range ½≦mD<4095/4096.

More elaborate scaling schemes that still rely on multiples of m can be formed from two addends. Two such schemes are shown below:

TABLE 2

Scaling to the Range ½ ≦ mD < ⅝

| | | |
|---|---|---|
| ½ ≦ D < ⅝ | m = 1 | ½ ≦ mD < ⅝ |
| ⅝ ≦ D < ¹¹⁄₁₆ | m = ⅞ | ³⁵⁄₆₄ ≦ mD < ⁷⁷⁄₁₂₈ |
| ¹¹⁄₁₆ ≦ D¹³⁄₁₆ | m = ¾ | ³³⁄₆₄ ≦ mD < ³⁹⁄₆₄ |
| ¹³⁄₁₆ ≦ D < 1 | m = ⅝ | ⁶⁵⁄₁₂₈ ≦ mD < ⅝ |

TABLE 3

Scaling to the Range ⅝ ≦ mD < ¾

| | | |
|---|---|---|
| ½ ≦ D < ⁹⁄₁₆ | m = 5⁄4 | ⅝ ≦ mD < ⁴⁵⁄₆₄ |
| ⁹⁄₁₆ ≦ D < ⅝ | m = 9⁄8 | ⁸¹⁄₁₂₈ ≦ mD < ⁴⁵⁄₆₄ |
| ⅝ ≦ D < ¾ | m = 1 | ⅝ ≦ mD < ¾ |
| ¾ ≦ D < ²⁷⁄₃₂ | m = ⅞ | ²¹⁄₃₂ ≦ mD < ¹⁸⁹⁄₂₅₆ |
| ²⁷⁄₃₂ ≦ D < 1 | m = ¾ | ⁸¹⁄₁₂₈ ≦ mD < ¾ |

Such prescaling of the dividend and divisor simplifies the quotient digit selection logic.

This improved scheme can generate six digits of quotient within about 13 gate delays, or about 2.2 gate delays per quotient digit.

It will be apparent to those skilled in the art that various modifications and variations can be made to the described embodiments without departing from the spirit or scope of the invention. The described embodiments can be implemented on an integrated circuit chip operating as part of a general purpose digital computer system or similar devices having a central processing unit and memory. Other embodiments of the present invention will be apparent to those skilled in the art from consideration of the specification and practice of the embodiments disclosed herein. Thus, it is intended that the specification and examples be considered as exemplary only, with a true scope and spirit of the invention being indicated by the following claims and their full range of equivalents:

What is claimed is:

1. A circuit for determining a quotient of a divisor and a dividend represented in binary signals comprising:

a partial remainder data path having a plurality of serially-connected partial remainder stages including:

a first partial remainder stage in said data path for receiving predetermined quantities including a first divisor, a first partial remainder, and first partial quotient values, and producing as outputs a second partial remainder, a second divisor, and second partial quotient values, wherein said outputs are input to the one of said partial remainder stages immediately following said first partial remainder stage in the data path; and successive partial remainder stages in the data path for receiving as inputs a preceding divisor and a preceding partial remainder from the one of said partial remainder stages immediately preceding said partial remainder stage in the data path;

producing as outputs a successive partial remainder, a successive divisor, and successive partial quotient values, wherein said outputs are input to the partial remainder stage immediately following each of said partial remainder stages in the data path;

and a plurality of fully overlapped quotient digit selection paths, each path comprising a plurality of serially-connected quotient digit stages, said selection paths including:

a first quotient digit selection path having a first quotient digit stage receiving as inputs predetermined quantities including the first partial remainder, the first partial remainder plus the first divisor, and the first partial remainder minus the first divisor;

successive quotient digit stages receiving as an input a quotient digit selected from the quotient digit stage immediately preceding each of said quotient digit stages in the first quotient digit selection path and producing as an output a new quotient digit that is input into the quotient digit stage immediately following each of said quotient digit stages in the first quotient digit selection path, and a final quotient digit stage in the first quotient digit selection path producing as an output a quotient digit for selecting new partial remainder candidates in a corresponding partial remainder stage in the partial remainder data path;

and successively staggered quotient digit selection paths having a first quotient digit stage receiving as an input a partial remainder output from the corresponding partial remainder stage in the series of partial remainder stages in the partial remainder data path, successive quotient digit stages receiving as an input a quotient digit selected from the quotient digit stage immediately preceding each of said quotient digit stages in each selection path and producing as an output a new quotient digit that is input into the quotient digit stage immediately following each of said quotient digit stages in the selection path, and a final quotient digit stage in each selection path producing as an output a quotient digit for selecting a new partial remainder in a corresponding partial remainder stage in the partial remainder data path.

2. The circuit of claim 1, wherein said circuit calculates the square root of a single integer or floating-point number represented in binary signals.

3. The circuit of claim 1, wherein the first quotient digit stage of the first quotient digit selection path examines four digits of the partial remainder quantities received as inputs from the corresponding partial remainder stage to perform speculative computations of the quotient digit.

4. The circuit of claim 1, wherein said dividend and divisor have at least 24 digits of precision.

5. The circuit of claim 1, wherein the dividend and divisor are prescaled by one of a plurality of fixed quantities to produce a prescaled dividend and prescaled divisor.

6. The circuit of claim 5, wherein said one of a plurality of fixed quantities is either equal to 1 when said divisor is less than ¾ or equal to ¾ when the divisor is not less than ¾.

7. The circuit of claim 5, wherein said prescaled divisor is less than the value 4095/4096.

8. The circuit of claim 5, wherein said prescaled divisor is less than the value ¾.

9. The circuit of claim 5, wherein only the three highest-order bits of the partial remainder are examined in the quotient bit selection path to select partial remainder candidates.

10. A circuit for determining a quotient of a divisor and a dividend represented in binary signals comprising:
   a partial remainder data path having a plurality of serially-connected partial remainder stages, including:
      a first partial remainder stage in the data path for
         receiving predetermined quantities including a first divisor, a first partial remainder, the first partial remainder plus the first divisor, the first partial remainder minus the first divisor, and first partial quotient values, and
         producing as outputs a second divisor, partial remainder candidates, and second partial quotient values, wherein said outputs are input to the one of said partial remainder stages immediately following said first partial remainder stage in the data path;
      successive partial remainder stages in the data path for
         receiving as inputs a preceding divisor and a partial remainder selected from said partial remainder candidates output from the partial remainder stage immediately preceding each of said partial remainder stages in the data path, and
         producing as outputs a successive divisor and successive partial remainder candidates and successive partial quotient values, wherein said outputs are input to the partial remainder stage immediately following each of said partial remainder stages in the data path;
      and
      a plurality of quotient digit selection paths, each path producing as an output a quotient digit for selecting new partial remainder candidates in a corresponding partial remainder stage in the partial remainder data path.

11. The circuit of claim 10, wherein the partial remainder candidates comprise the preceding partial remainder, the preceding partial remainder plus the preceding divisor, and the preceding partial remainder minus the preceding divisor.

12. The circuit of claim 10, wherein each of said partial remainder stages includes:
   a plurality of adders for forming intermediate partial remainder candidates from the partial remainder candidates received as inputs and from the divisor,
   a plurality of multiplexors coupled to the outputs of the partial adders and having inputs coupled to a corresponding quotient digit for selecting partial remainder candidates according to the corresponding quotient digit, and
   alignment circuits for scaling the new partial remainder candidates and outputting said scaled candidates to the partial remainder stage immediately following each of said partial remainder stages in the data path.

13. The circuit of claim 10, wherein said circuit calculates the square root of a single integer or floating-point number.

14. The circuit of claim 10, wherein said dividend and divisor have at least 24 digits of precision.

15. The circuit of claim 10, wherein the dividend and divisor are prescaled by one of a plurality of fixed quantities to produce a prescaled dividend and prescaled divisor.

16. The circuit of claim 15, wherein said one of a plurality of fixed quantities is either equal to 1 when said divisor is less than ¾ or equal to ¾ when the divisor is not less than ¾.

17. The circuit of claim 15, wherein said prescaled divisor is less than the value 4095/4096.

18. The circuit of claim 15, wherein said prescaled divisor is less than the value ¾.

19. The circuit of claim 15, wherein only the three highest-order bits of the partial remainder are examined in the quotient bit selection path to select partial remainder candidates.

20. The circuit of claim 10, wherein the number of said partial remainder stages for selecting partial remainder quantities per clock cycle is not dependent on the number of quotient digit stages in each quotient digit selection path.

21. The circuit of claim 10, wherein said plurality of adders and corresponding plurality of multiplexors in each partial remainder stage are merged to carry out additions in base 4.

22. A circuit for determining a quotient of a divisor and a dividend represented in binary signals comprising:
   a partial remainder data path having a plurality of serially-connected partial remainder stages, including:
      a first partial remainder stage in the data path for
         receiving predetermined quantities including a first divisor, a first partial remainder, the first partial remainder plus the first divisor, the first partial remainder minus the first divisor, and first partial quotient values, and
         producing as outputs a second divisor, partial remainder candidates, and second partial quotient values, wherein said outputs are input to the one of said partial remainder stages immediately following said first partial remainder stage in the data path;
      successive partial remainder stages in the data path for
         receiving as inputs a preceding divisor and a preceding partial remainder selected from said partial remainder candidates output from the partial remainder stages immediately preceding each of said partial remainder stage in the data path,
         producing as outputs a successive divisor, successive partial remainder candidates, and successive partial quotient values, wherein said outputs are input to the partial remainder stage immediately following each of said partial remainder stages in the data path;
      and
      a plurality of fully overlapped quotient digit selection paths, each path comprising a plurality of serially-connected quotient digit stages, said selection paths including:
         a first quotient digit selection path having
            a first quotient digit stage receiving as inputs predetermined quantities including the first partial remainder, the first partial remainder plus the first divisor, and the first partial remainder minus the first divisor;
            successive quotient digit stages receiving as an input a quotient digit selected from the quotient digit stage immediately preceding each of said quotient digit stages in the first quotient digit selection path and producing as an output a new quotient digit that is input into the quotient digit stage immediately following each of said quotient digit stages in the first quotient digit selection path, and a final quotient digit stage in the first quotient digit selection path producing as an output a quotient digit for selecting new partial remainder candidates in a corresponding partial remainder stage in the partial remainder data path;
and
successively staggered quotient digit selection paths having
a first quotient digit stage receiving as an input a partial remainder output from the corresponding partial remainder stage in the series of partial remainder stages in the partial remainder data path,
successive quotient digit stages receiving as an input a quotient digit selected from the quotient digit stage immediately preceding each of said quotient digit stages in each selection path and producing as an output a new quotient digit that is input into the quotient digit stage immediately following each of said quotient digit stages in the selection path, and
a final quotient digit stage in each selection path producing as an output a quotient digit for selecting new partial remainder candidates in a corresponding partial remainder stage in the partial remainder data path.

23. The circuit of claim 22, wherein said circuit calculates the square root of a single integer or floating-point number represented in binary signals.

24. The circuit of claim 22, wherein the partial remainder candidates comprise the preceding partial remainder, the preceding partial remainder plus the preceding divisor, and the preceding partial remainder minus the preceding divisor.

25. The circuit of claim 22, wherein the first quotient digit stage of the first quotient digit selection path examines four digits of the partial remainder quantities received as inputs from the corresponding partial remainder stage to perform speculative computations of the quotient digit.

26. The circuit of claim 22, wherein said dividend and divisor have at least 24 digits of precision.

27. The circuit of claim 22, wherein the dividend and divisor are prescaled by one of plurality of fixed quantities to produce a prescaled dividend and prescaled divisor.

28. The circuit of claim 27, wherein said one of a plurality of fixed quantities is either equal to 1 when said divisor is less than the ¾ or equal to ¾ when the divisor is not less than ¾.

29. The circuit of claim 27, wherein said prescaled divisor is less than the value 4095/4096.

30. The circuit of claim 27, wherein said prescaled divisor is less than the value ¾.

31. The circuit of claim 27, wherein only the three highest-order bits of the partial remainder are examined in the quotient bit selection path to select partial remainder candidates.

32. The circuit of claim 22, wherein the number of said partial remainder stages for selecting new partial remainder quantities per clock cycle is not dependent on the number of quotient digit stages in each quotient digit selection path.

33. The circuit of claim 22, wherein said plurality of adders and corresponding plurality of multiplexors in each partial remainder stage are merged to carry out additions in base 4.

34. A method for determining the quotient of a divisor and a dividend comprising the steps of
receiving predetermined quantities including the divisor, a partial remainder, the partial remainder plus the divisor, the partial remainder minus the divisor, and the partial quotient;
performing a first series of overlapping speculative computations of quotient digits, said step further including the steps of
computing a first quotient digit based on said predetermined quantities,
performing a speculative computation for each successive quotient digit in said first series based on said predetermined quantities to produce a plurality of quotient digit candidates, and
selecting one of said plurality of quotient digit candidates for each of said successive quotient digits based on the previously selected quotient digit;
selecting new partial remainder quantities based on the final selected one of said plurality of quotient digit candidates in said first series;
performing a plurality of successive series of overlapping speculative computations of quotient digits, in each series, said step further including the steps of
computing a first quotient digit based on a corresponding partial remainder quantities;
performing a speculative computation for each successive quotient digit in the series to produce a plurality of quotient digit candidates, and
selecting one of said plurality of quotient digit candidates for each of said successive quotient digits in the series based on the nervously selected quotient digit; and
selecting new partial remainder quantities based on the final selected one of said plurality of quotient digit candidates in the series for a successive series of overlapping speculative quotient computations.

35. The method of claim 34, wherein said method calculates the square root of a single integer or floating-point number represented in binary signals.

36. The method of claim 34, where said speculative computation of the quotient digit includes the step of examining four digits of the partial remainder quantities received to perform speculative computations of the quotient digit for each stage.

37. The method of claim 34, wherein said dividend and divisor have at least 24 digits of precision.

38. The method of claim 34, wherein the dividend and divisor are prescaled by one of a plurality of fixed quantities to produce a prescaled dividend and prescaled divisor.

39. The method of claim 38, wherein said one of a plurality of fixed quantities is either equal to 1 when said divisor is less than ¾ or equal to ¾ when the divisor is not less than ¾.

40. The method of claim 38, wherein said prescaled divisor is less than the value 4095/4096.

41. The method of claim 38, wherein said prescaled divisor is less than the value ¾.

42. The method of claim 38, wherein only the three highest-order bits of the partial remainder are examined in the quotient bit selection paths to select partial remainder candidates.

43. A method for determining the quotient of a divisor and a dividend comprising the steps of
receiving predetermined quantities including the divisor, a partial remainder, the partial remainder plus the divisor, the partial remainder minus the divisor, and the partial quotient;
performing a plurality of overlapping speculative computations of quotient digits and developing partial remainder quantities, said step further including the steps of formulating a first plurality of partial remainder candidates based on said predetermined quantities;

selecting said first plurality of partial remainder candidates based on the corresponding quotient digit to produce partial remainder quantities;

formulating successive pluralities of partial remainder candidates, based on the new partial remainder quantities previously selected;

selecting said successive plurality of partial remainder candidates based on the corresponding quotient digit to produce new partial remainder quantities.

44. The method of claim 43, wherein said method calculates the square root of a single integer or floating-point number represented in binary signals.

45. The method of claim 43, wherein said dividend and divisor have at least 24 digits of precision.

46. The method of claim 43, wherein the dividend and divisor are prescaled one of a plurality of fixed quantities selected as a function of the divisor.

47. The method of claim 43, wherein the step of performing speculative computations of quotient digits is based on new triply redundant partial remainders generated from said step of developing new partial remainder quantities.

48. A method for determining the quotient of a divisor and a dividend comprising the steps of receiving predetermined quantities including the divisor, a partial remainder, the partial remainder plus the divisor, the partial remainder minus the divisor, and the partial quotient;

performing a plurality of overlapping speculative computations of quotient digits, said step further including the steps of computing a first quotient digit based on said predetermined quantities, performing a speculative computation for each successive quotient digit based on said predetermined quantities to produce a plurality of quotient digit candidates, and selecting one of said plurality of quotient digit candidates for each of said successive quotient digits based on the previously selected quotient digit;

and developing new partial remainder quantities, said step further including the steps of formulating a first plurality of partial remainder candidates based on said predetermined quantities;

selecting said first plurality of partial remainder candidates based on the corresponding quotient digit to produce new partial remainder quantities;

formulating successive pluralities of partial remainder candidates, based on the new partial remainder quantities previously selected;

selecting said successive plurality of partial remainder candidates based on the corresponding quotient digit to produce new partial remainder quantities.

49. The method of claim 48, wherein said method calculates the square root of a single integer or floating-point number represented in binary signals.

50. The method of claim 48, where said speculative computation of the quotient digit includes the step of examining four digits of the partial remainder quantities received to perform speculative computations of the quotient digit for each stage.

51. The method of claim 48, wherein said dividend and divisor have at least 24 digits of precision.

52. The method of claim 48, wherein the dividend and divisor are prescaled by one of a plurality of fixed quantities selected as a function of the divisor.

53. The method of claim 48, where the step of performing speculative computations of quotient digits is based on new triply redundant partial remainders generated from said step of developing new partial remainder quantities.

54. A circuit for determining a quotient of a divisor and a dividend represented in binary signals comprising:

a partial remainder data path having a plurality of serially-connected partial remainder stages including:

a first partial remainder stage in said data path for receiving predetermined quantities including a first divisor, a first partial remainder, and first partial quotient values, and producing as outputs a second partial remainder, a second divisor, and second partial quotient values, wherein said outputs are input to the one of said partial remainder stages immediately following said first partial remainder stage in the data path;

and successive partial remainder stages in the data path for receiving as inputs a preceding divisor and a preceding partial remainder from the one of said partial remainder stages immediately preceding said partial remainder stage in the data path;

producing as outputs a successive partial remainder, a successive divisor, and successive partial quotient values, wherein said outputs are input to the partial remainder stage immediately following each of said partial remainder stages in the data path;

and a plurality of quotient digit selection paths, each path producing as an output a quotient digit for selecting new partial remainder candidates in a corresponding partial remainder stage in the partial remainder data path.

55. The circuit of claim 54, wherein the dividend and divisor are prescaled by one of a plurality of fixed quantities to produce a prescaled dividend and prescaled divisor.

56. The circuit of claim 55, wherein said one of a plurality of fixed quantities is either equal to 1 when said divisor is less than ¾ or equal to ¾ when the divisor is not less than ¾.

57. The circuit of claim 55, wherein said prescaled divisor is less than the value 4095/4096.

58. The circuit of claim 55, wherein said prescaled divisor is less than the value ¾.

59. The circuit of claim 55, wherein only the three highest-order bits of the partial remainder are examined in the quotient bit selection path to select partial remainder candidates.

60. A computer system comprising:

a computer processor;

a memory which is operatively coupled to the computer processor; and a computer circuit operatively coupled to the computer processor and memory for determining a quotient of a divisor and a dividend represented in binary signals comprising:

a partial remainder data path having a plurality of serially-connected partial remainder stages, including:

a first partial remainder stage in the data path for receiving predetermined quantities including a first divisor, a first partial remainder, the partial remainder plus the divisor, the partial remainder minus the divisor, and first partial quotient values, and producing as outputs a second divisor, partial remainder candidates and second partial quotient values, wherein said outputs are input to the one of said partial remainder stages immediately following said first partial remainder stage in the data path; successive partial remainder stages in the data path for receiving as inputs a preceding divisor and a new partial remainder selected from said partial remainder candidates output from the partial remainder stages immediately preceding each of said partial remainder stage in the data path, producing as outputs successive divisor, partial remainder candidates, and successive partial quotient values, wherein said outputs are input to the partial remainder stage immediately following each of said partial remainder stages in the data path;

and a plurality of fully overlapped quotient digit selection paths, each path comprising a plurality of serially-connected quotient digit stages, said selection paths including:

a first quotient digit selection path having
a first quotient digit stage receiving as inputs predetermined quantities including a first partial remainder, the first partial remainder plus the first divisor, and the first partial remainder minus the first divisor;

successive quotient digit stages receiving as an input a quotient digit selected from the quotient digit stage immediately preceding each of said quotient digit stages in the first quotient digit selection path and producing as an output a new quotient digit that is input into the quotient digit stage immediately following each of said quotient digit stages in the first quotient digit selection path, and a final quotient digit stage in the first quotient digit selection path producing as an output a quotient digit for selecting new partial remainder candidates in a corresponding partial remainder stage in the partial remainder data path;

and successively staggered quotient digit selection paths having
a first quotient digit stage receiving as an input a partial remainder output from the corresponding partial remainder stage in the series of partial remainder stages in the partial remainder data path, successive quotient digit stages receiving as an input a quotient digit selected from the quotient digit stage immediately preceding each of said quotient digit stages in each selection path and producing as an output a new quotient digit that is input into the quotient digit stage immediately following each of said quotient digit stages in the selection path, and a final quotient digit stage in each selection path producing as an output a quotient digit for selecting partial remainder candidates in a corresponding partial remainder stage in the partial remainder data path.

* * * * *

UNITED STATES PATENT AND TRADEMARK OFFICE
CERTIFICATE OF CORRECTION

PATENT NO. : 5,910,910
DATED : June 8, 1999
INVENTOR(S) : STEELE, JR.

It is certified that error appears in the above-identified patent and that said Letters Patent is hereby corrected as shown below:

On the Title Page, Item [75], in the Inventor, after "Steele", delete --,--.

In Claim 34, col. 16, line 29, "nervously" should read --previously--.

Signed and Sealed this

Fourth Day of July, 2000

Attest:

Attesting Officer

Q. TODD DICKINSON
Director of Patents and Trademarks